(12) United States Patent
Konno et al.

(10) Patent No.: US 6,718,231 B2
(45) Date of Patent: Apr. 6, 2004

(54) AUTHORING SYSTEM AND AUTHORING METHOD, AND STORAGE MEDIUM

(75) Inventors: Reizo Konno, Tokyo (JP); Satoko Ogure, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/130,935

(22) PCT Filed: Sep. 28, 2001

(86) PCT No.: PCT/JP01/08602

§ 371 (c)(1),
(2), (4) Date: May 24, 2002

(87) PCT Pub. No.: WO02/26450

PCT Pub. Date: Apr. 4, 2002

(65) Prior Publication Data

US 2003/0023347 A1 Jan. 30, 2003

(30) Foreign Application Priority Data

Sep. 28, 2000 (JP) ........................................ 2000-295719

(51) Int. Cl.⁷ .............................................. G06F 19/00
(52) U.S. Cl. ...................... 700/245; 700/94; 379/88.03; 446/141; 446/142; 446/268
(58) Field of Search ................ 700/245, 94; 379/88.03; 209/203, 217; 446/141, 142, 268

(56) References Cited

U.S. PATENT DOCUMENTS

2002/0107591 A1 * 8/2002 Gabai et al. .................. 700/94

FOREIGN PATENT DOCUMENTS

| JP | 8-314527 | 11/1996 |
|---|---|---|
| JP | 11-58274 | 3/1999 |
| JP | 2000-83194 | 3/2000 |
| JP | 2000-506637 | 5/2000 |
| WO | WO 97/14102 | 4/1997 |

OTHER PUBLICATIONS

Brantmark et al., Man/machine communication in ASEA's new robot controller, 1982, ASEA Journal vol. 55, No. 6, pp. 145–150.*

* cited by examiner

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

An action editing window (200) is formed as a time table of a two-dimensional time line style, made up by a horizontal time axis and a vertical channel. Within the time line table, respective constituent elements of an action of a robot, such as a time ruler (201), a keyframe channel (202), a motion channel (203), a sound channel (204) or an LED operation channel (205), are chronologically displayed. A user is able to edit as synchronization between the respective components of the action is checked. This supports the creation and the editing of a series of commands and data stating a pattern of robot movements.

71 Claims, 23 Drawing Sheets

FILE

NEW PROJECT

OPEN PROJECT

SAVE PROJECT

SAVE PROJECT ANEW

END

FIG.7

MATERIAL

CREATE NEW BEHAVIOR

CREATE NEW ACTION

READ-IN MATERIAL

DELETE MATERIAL

FIG.8

AUTHORING SYSTEM AND AUTHORING METHOD, AND STORAGE MEDIUM

TECHNICAL FIELD

This invention relates to an authoring system and an authoring method for supporting creation and editing of data in accordance with a preset scenario and, more particularly, to an authoring system and an authoring method for supporting creation and editing of a sequence of commands/data stating a preset operating pattern of a robot.

More particularly, it relates to an authoring system and an authoring method for supporting creation and editing of an operating pattern using a set of components prescribing the operating states of a robot, and to an authoring system and an authoring method for arraying the respective components on a computer display for supporting creation and editing of the operating pattern.

BACKGROUND ART

A mechanical apparatus for performing movements simulating the movement of the human being, using electrical or magnetic operation, is termed a "robot". The etymology of the term robot is said to be "ROBOTA" (slave machine) of the Slavic language. The robots started to be used widely in this country towards the end of the sixtieth. Most of the robots used were industrial robots, such as manipulators or transporting robots, aimed at automation or unmanned operations in plants.

In recent years, researches and development in legged mobile robots, including pet type robots, simulating the bodily mechanism or movements of animals, such as quadruples, e.g., dogs or cats, or so-called humanoid robots, simulating the bodily mechanism or movements of animals erected and walking on feet, such as human being, are progressing, and expectations are made of practical utilization of these types of robots. The legged mobile robots, while being unstable and difficult to control as to their orientation or walking, as compared to crawler or tire type robots, are superior in their performance in climbing up and down a ladder or a staircase, in riding over obstacles or walking or in running flexibly on a leveled or non-leveled terrain.

The standstill type robots, installed and used at a fixed place, such as armed robots, are in operation only in a stationary or local working space, such as for assembling or sorting of component parts. On the other hand, the mobile robots are not limited as to working space and are movable on a preset or undefined path in an unrestricted fashion to perform operations to take the place of human operators or to offer variegated services to take the place of the human being, dogs or other living organisms.

One of the usages of the legged mobile robot is substitution of a variety of operations dangerous or difficult to perform in industrial or productive activities. Examples of these usages include substitution of a variety of operations dangerous or difficult to perform, such as maintenance operations in nuclear power plants, thermal power plants or petrochemical plants, transporting or assembling operations in manufacturing plants, cleaning in high-rise buildings or rescuing e.g., on the site of conflagrations.

Another usage of the legged mobile robot is life-related usage, such as co-living with or rendering entertainment for the human being, rather than acting as the operational support described above. This sort of robot emulates a rich feeling expression exploiting the four limbs or an operation mechanism of the legged walking animal of high intellect, such as human being or dog (pet). Moreover, this sort of the robot is requested not only to execute the pre-set operating pattern measly faithfully, but also to realize vivid expressions dynamically responding to the language or behavior of a counterpart operator, such as 'praising', 'scolding' or 'patting'.

With a conventional toy machine, the relationship between the user operation and the responsive operation is fixed, such that the toy's movements cannot be changed to suit to the user's liking. The result is that the user gets tired of the toy, simply repeating only the same sort of the operations, sooner or later.

Conversely, an intellectual robot owns a behavioral or learning model, emanating from movements, and determines its movements as it varies the model based on the input information from outside, such as speech, image or tactile feeling, to realize autonomous thinking or operation control. The feeling or the autonomous behavior of the robot itself can be represented by providing the robot with the feeling or instinct model. By the robot owning a picture inputting device or with a speech input/output device and executing the processing of picture or speech recognition, it is possible to realize realistic communication between the robot and the human being on a higher intellectual level.

In addition, by affording the possibility of changing the model responsive to the detection of a stimulus from outside, such as user's actuation, that is the 'learning effect', it is possible to present to the user a movement pattern which is not tiresome to the user or which adapts itself more satisfactorily to the user's liking.

Nowadays, the legged mobile robot owns a high information processing capability, such that the robot itself may be thought of as a sort of a computing system. Consequently, the sequence of the highly advanced sophisticated operations, constructed by the operating pattern, realized on the robot, or by the combination of plural basic operating patterns, may be constructed by an operation similar to that performed in the computer programming.

In near future, it may be anticipated that the robot becomes more popular to become more diffused not only in industrial circles but also in households and in our everyday life. In particular, as concerns products which pursue entertainment aspects, it may be anticipated that consumers at large, not having profound knowledge in computer or computer programming, purchase and use the robot. It may be thought to be desirable to provide the users at large with a tool which helps create and edit the operating sequence of the robot relatively readily and efficiently by interactive processing, that is with a so-called authoring system.

DISCLOSURE OF THE INVENTION

It is therefore an object of the present invention to provide an excellent authoring system and method which are able to help create and edit a sequence of command/data stating a preset operating pattern of the robot.

It is another object of the present invention to provide an excellent authoring system and method which are able to help create and edit an operating pattern using a set of components prescribing the operating states of a robot.

It is a further object of the present invention to provide an excellent authoring system and method which allow to array various components on a computer display to help create and edit an operating pattern for the robot.

An authoring system according to the present invention is such a system supporting the creation and editing of an action of a multi-joint structure comprised of a combination of a plurality of chronological data, including a user inputting unit for inputting commands or data from a user, a user presenting unit for presenting an editing area in which chronological data making up the action are arrayed chronologically along the time axis, and a chronological data editing unit provided for each chronological data making up the action. The chronological data editing unit creates or edits relevant chronological data based on a user input through the user presenting unit.

The 'system' herein means a logical assembly of plural devices or functional modules realizing specified functions, without regard to whether or not the individual devices or functional modules are enclosed in one casing.

The multi-joint structure is a legged robots having two legs, four legs and so forth and which are constructed from plural joint actuators. Alternatively, the multi-joint structure may be other types of multi-joint robots, or a character for producing an animation, based on joint movements, as a result of computer graphics.

The chronological data making up the action may be motion data stating the chronological movements of respective joints of the multi-joint structure. The motion data may prescribe chronological movements of respective joints of the multi-joint structure and, by arraying two or more keyframes, each representing the multi-joint structure striking a preset pose on the time axis, may smoothly join the respective keyframes.

Another chronological data making up the action is sound data output as sound in timed relation to reproduction of the action. The sound data may be stated in the MIDI (Musical Instrumental Digital Interface) form or WAVE form.

Still another example of the chronological data making up the action is indicator display data stating the turning on/off of display indicators displayed in timed relation to action reproduction. The indicator display data may be stated in the MIDI (Musical Instrumental Digital Interface) form.

The editing area presented by the user presenting unit may be comprised of chronological-data-based chronological data display channels. These data extend along the horizontally arrayed time axis, with the display channels being arrayed in the vertical direction.

That is, with the authoring system according to the present invention, the chronological data making up an action of the mobile robot may be displayed as they are arrayed along the time axis on the time table of the two-dimensional time line style. Consequently, the creation and editing may be prosecuted as synchronization between the respective chronological data is visually checked so that a working environment efficient and intuitively comprehensible may be provided for action editing.

The editing area presented by the user presenting unit may include one or more time display lines extending in the vertical direction for specifying the relevant time as prescribed by the time ruler. In such case, the state of progress between the respective time indicating lines or the state of synchronization between the respective chronological data channels may be visually checked with the time indicating lines as a reference.

The editing area presented by the user presenting unit may include a vertically extending current time display line for indicating the current time on the time axis prescribed by the time ruler. The current time display line may be configured for being shifted on the time ruler to a position corresponding to user actuation.

The editing area presented by the user presenting unit may include a display window for previewing movements of the multi-joint structure at the current time.

The editing area presented by the user presenting unit may include a keyframe channel for indicating the respective keyframes or thumbnails thereof along the time axis as prescribed by the time ruler. In the keyframe channel, the time changes of the keyframe may be accommodated so as to follow up with keyframe or thumbnail dragging. A pose editing picture for editing a relevant pose may be started responsive to the operation of selection by the user of the keyframe or thumbnail within the keyframe channel.

The editing area presented by the user presenting unit may also include a motion channel for editing and displaying the contents of a motion along the time axis prescribed by the time ruler. This motion channel is constructed by arraying respective timing charts, representing the chronological movements of respective joints of the multi-joint structure in the vertical direction. It is also possible to accommodate changes in the joint movements at a relevant time point so as to follow up with dragging on the timing chart in the motion channel.

The editing area presented by the user presenting unit may also be provided with a sound channel for indicating the contents of the sound along the time axis as prescribed by the time ruler, or with a display indicator channel for displaying the contents of the indicator display data along the time axis prescribed by the time ruler.

The user presenting unit may also be provided with a sound editing area for displaying and editing the sound contents along the time axis prescribed by the time ruler.

The sound editing area may include a score channel constituted by a basic grid along the time axis direction and by a piano keyboard. In this case, a score is formed by the sound duration as the reference of the time axis and the pitch of the piano keys. On the score channel, the sound may be edited by arraying the color corresponding to sound notes in a cell corresponding to the desired time point and the sound scale. The velocity channel may also be demonstrated for representing the intensity of each sound along the time axis.

The user presenting unit may further include an indicator editing area for displaying and editing the contents of indicator data along the time axis prescribed by the time ruler.

The indicator editing area includes a score channel constituted by a list of sites of arraying of display indicators and by the basic grid along the time axis direction. In such case, a score may be edited from one site list to another by indicating the turned-on state of the indicator in each site on the time axis on a score channel.

The user presenting unit may further display a preview window for visually checking an action of the multi-joint structure generated based on each chronological data as edited by the chronological data editing unit.

The preview window may include a 3D view area for three-dimensional display of movements of the multi-joint structure generated based on motion data. The preview window may include a display indicator operation preview area for displaying the operation of the indicators corresponding to the indicator display data in synchronism with the preview of other chronological data.

The user presenting unit may further display a pose window for editing the pose of the multi-joint structure by the GUI operation.

The pose window may include an entity specifying area for displaying the multi-joint structure in a developed plan view for accepting user selection of editable sites. The authoring pose window may include a list specifying area for displaying a list of editable sites of the multi-joint structure and setting values thereof. The pose window may also include a setting value area for displaying a list of the names of setting sites, setting values, settable maximum values and settable minimum values of editable sites of the multi-joint structure. The pose window may also include a 3D display area for 3D displaying a full image of the multi-joint structure generated by 3D graphics and for accepting user selection on the 3D display.

The authoring system may also include data inputting means for inputting chronological data making up an action of the multi-joint structure from outside. The pose window may also display the pose generated based on data input from the data inputting means.

The user presenting unit may further display a motion preview window arraying one or more key frames making up the motion or thumbnails thereof in accordance with the chronological sequence used in motion reproduction.

An authoring method according to the present invention is such a method for supporting the creation and editing of an action of a multi-joint structure comprised of a combination of a plurality of chronological data, and includes a user presenting step of presenting an editing area in which the chronological data making up the action are arrayed chronologically along the time axis and a chronological data editing step for creating or editing relevant chronological data based on a user input through the editing area, provided for each chronological data making up the action, via the user presenting step.

One of the chronological data making up the action is motion data stating the chronological movements of respective joints of the multi joint structure. This motion data may prescribe chronological movements of respective joints of the multi-joint structure. The motion data smoothly joins two or more keyframes by arraying these keyframes each representing the multi-joint structure striking a preset pose on the time axis.

Another example of the chronological data making up the action is sound data output as sound in timed relation to reproduction of the action. The sound data may be stated in the MIDI (Musical Instrumental Digital Interface) form or WAVE form. Still another example of chronological data making up the action is display indicator display data stating the turning on/off of display indicators, with the display data being displayed in timed relation to reproduction of the action. The indicator display data may be stated in the MIDI (Musical Instrumental Digital Interface) form.

The editing area presented in the user presenting step may be comprised of chronological-data-based chronological data display channels, with the data extending along the horizontally arrayed time axis, the channels being arrayed in the vertical direction.

That is, with the authoring method according to the present invention, the chronological data forming the action of the mobile robot, such as motion data, sound data or LED operating data, may be arrayed and displayed along the time axis on the timetable of the two-dimensional time line style to render it possible to visually check the synchronization between respective chronological data in prosecuting the creation or editing. The result is provision of a working environment for action edition which is more efficient and comprehensible intuitively.

The editing area presented in the user presenting step may include a time ruler comprised of graduations used to display the time axis in real-time. In such case, it is possible to readily visually recognize the synchronization between the respective chronological data channels and the time axis.

The editing area presented by the user presenting step may include one or more time display lines extending in the vertical direction for indicating the relevant time prescribed by a time ruler. In such case, the state of progress between the respective time indicating lines or the state of synchronization between the respective chronological data channels may be visually checked with the time indicating lines as a reference.

The user presenting step may present an editing area having a vertically extending current time display line for indicating the current time on the time axis prescribed by the time ruler. There may further be included a further step of shifting the current time display line on the time ruler to a position corresponding to user actuation.

There may further be provided a step of presenting a display window for previewing movements of the multi-joint structure at the current time.

The user presenting step may further present an editing area having a keyframe channel for demonstrating each keyframe or its thumbnail in accordance with the time axis prescribed by the time ruler. In such case, there may further be provided a step of changing the keyframe time so as to follow up with dragging of the keyframe or its thumbnail in the keyframe channel. There may also be provided a step of starting a pose editing picture for editing the relevant pose responsive to the user's operation for selecting the keyframe or its thumbnail in the keyframe channel.

The user presenting step may also present an editing area provided with a motion channel for editing and displaying the motion contents along the time axis prescribed by the time ruler. In such case, the respective timing charts representing the chronological movements of the respective joints of the multi-joint structure may be arrayed vertically to represent the motion channel. There may further be provided a step of changing the joint movements at the relevant time points such as to follow up with dragging on the timing charts in the motion channel.

In the user presenting step, there may be presented an editing area having a sound channel for demonstrating the sound contents along the time axis prescribed by the time ruler. Alternatively, the user presenting step may present an editing area having a display indicator channel for displaying the contents of the indicator display data along the time axis prescribed by the time ruler.

The authoring method may further include a step of displaying the sound editing area for displaying and editing the sound contents along the time axis prescribed by the time ruler.

The sound editing area may include a score channel constituted by a basic grid along the time axis direction and a piano keyboard. In such case, a score is formed by the sound duration as the reference of the time axis and by the pitch of the piano keys. On the score channel, the sound may be edited by arraying the color corresponding to sound notes in a cell corresponding to the desired time point and the sound scale on the score channel. The sound editing area may also include a velocity channel for representing the intensity of each sound along the time axis.

The authoring method may further include a step of demonstrating a display indicator editing area for displaying and editing the contents of the indicator display area along the time axis prescribed by the tie ruler.

The indicator editing area may include a score channel constituted by a list of arraying sites of the display indicators and by the basic grid along the time axis direction. In such case, the score may be edited from one site list to another by demonstrating the turned-on state of the display indicators in respective sites on the time axis on a score channel.

The authoring method may further include a step of displaying a preview window for visually checking an action of the multi-joint structure generated based on each chronological data as edited in the chronological data editing step.

The preview window indicating step may three-dimensionally display movements of the multi-joint structure, generated based on motion data, in a 3D view area. Alternatively, the preview window indicating step may display the operation of the display indicators corresponding to the indicator display data in synchronism with the preview of other chronological data.

The authoring method may further include a step of displaying a pose window for editing the pose of the multi-joint structure by the GUI operation.

The pose window may include an entity specifying area for displaying the multi-joint structure in a developed plan view for accepting user selection of editable sites, a list specifying area for displaying a list of editable sites of the multi-joint structure and setting values thereof, a setting value area for displaying a list of the names of setting sites, setting values, settable maximum values and settable minimum values of editable sites of the multi-joint structure, or a 3D display area for 3D demonstrating a full image of the multi-joint structure generated by 3D graphics and for accepting user selection of the editable sites on the 3D display.

The authoring method may further include a data inputting step of inputting chronological data making up an action of the multi-joint structure from outside. The pose window displays the pose generated based on data input from the data inputting step.

The authoring method may also include a step of displaying a motion preview window arraying one or more key frames making up the motion or thumbnails thereof in accordance with the chronological sequence used in motion reproduction.

A recording medium according to the present invention has physically stored thereon, in a computer-readable form, a computer software stating the processing for supporting the creation and editing of an action of a multi-joint structure, comprised of the combination of plural chronological data, on a computer system. The computer software includes a user presenting step of presenting an editing area in which chronological data making up the action are arrayed chronologically along the time axis, and a chronological data editing step of creating or editing relevant chronological data based on a user input through an editing area by the user presenting step. The editing area is provided for each chronological data making up the action.

The recording medium according to the present invention is a medium for physically furnishing a computer software in a computer readable form to the general-purpose computer system capable of executing a variety of program codes. Such medium is a removable portable recording medium, exemplified by a CD (Compact Disc), an FD (Floppy Disc), a MD (Mini-Disc) or a MO (Magneto-Optical Disc). It is also possible to furnish the computer software to a specified computer system in a computer readable form through a transmission medium, such as a network, which may be a wireless or cable network.

This recording medium represents a definition of the cooperative relationship between the computer software an the recording medium in structure or function in order to achieve the functions of the preset computer software on the computer system. Stated differently, by installing a preset compute software on a computer system through a recording medium according to the third aspect of the present invention, the cooperative action may be manifested on the computer system to achieve the operation and effect similar to those of the authoring system and method in the first and second aspects of the present invention.

Other objects, features and advantages of the present invention will become more apparent from reading the embodiments of the present invention as shown in the drawings.

BRIEF DESCRIPTION OF THE DRAWINGS

FIG. 7 indicates a submenu item of a menu 'file' in the project window.

FIG. 8 indicates a submenu item of a menu 'material' in the project window.

BEST MODE FOR CARRYING OUT THE INVENTION

Figure 1:
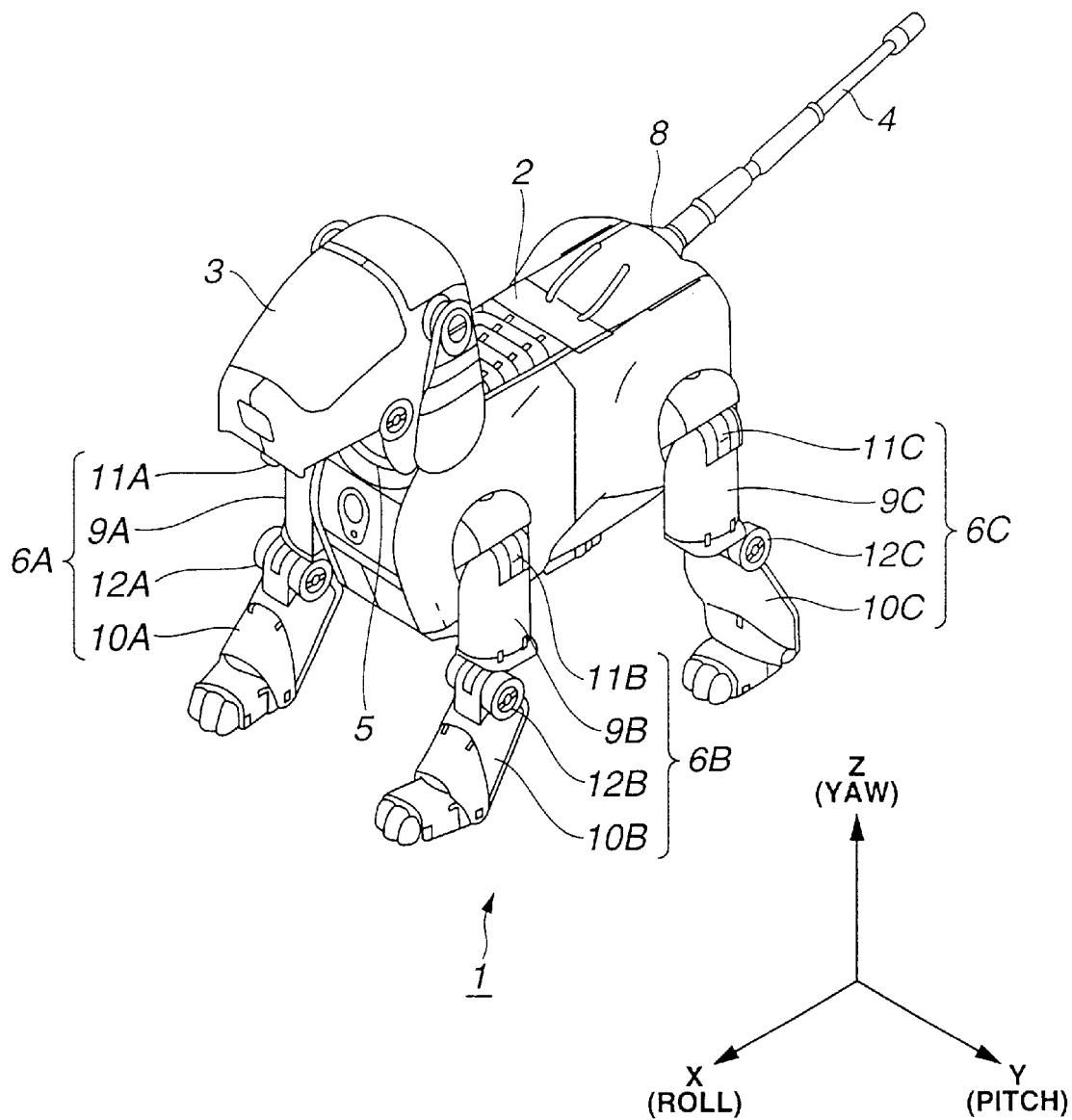
FIG. 1 is a perspective view of a mobile robot 1 performing walking on four legs, embodying the present invention.

Referring to the drawings, certain preferred embodiments of the present invention will be explained in detail.

A. Robot Structure

FIG. 1 shows the appearance and the structure of the mobile robot 1 performing legged movements on four legs, embodying the present invention. As shown, the robot 1 is a multi-articulated mobile robot, constructed after the shape and the structure of a four-legged animal as a model. In particular, the mobile robot 1 of the present embodiment has the aspect of a pet type robot, designed after the shape and the structure of a dog, as representative of a pet animal, and is able to co-exist with the human being in the human living environment and to express the operations responsive to the user's operations.

The mobile robot 1 has a trunk unit 2, a head unit 3, a tail 4 and four limbs, that is leg units 6A to 6D.

The head unit 3 is arranged at approximately the fore upper end of the trunk unit 2 through a neck joint 7 having the degrees of freedom in the roll, pitch and yaw directions, as shown. On the head unit 3, there are loaded a CCD (charge coupled device) camera 15, equivalent to the 'eye' of the dog, a microphone 16, equivalent to its 'ear', a loudspeaker 17, equivalent to its 'mouth', a touch sensor 18, equivalent to its tactile sense, and a plural number of LED indicators 19. There may also be loaded other sensors making up the five senses of the living being.

The tail 4 is mounted for bending or pivoting movements on the approximately rear upper end of the trunk unit 2 through a tail joint 8 having the degrees of freedom of roll and pitch axes.

A pair of leg units 6A, 6B make up fore legs, whilst leg units 6C, 6D make up hind legs. The leg units 6A to 6D are each comprised of combination of thigh units 9A to 9D and shank units 10A to 10D, and are mounted at fore and aft and left and right corners of the bottom surface of the trunk unit 2. The thigh units 9A to 9D are connected to preset sites of the trunk unit 2 by hip joints 11A to 11D having the degrees of freedom about roll, pitch and yaw axes. The thigh units 9A to 9D and the shank units 10A to 10D are interconnected by knee joints 12A to 12D having the degrees of freedom about the roll and pitch axes.

With the above-described legged mobile robot 1, constructed as described above, the respective joint actuators may be driven under the commands from a controller, as later explained, for swinging the head unit 3 in the up-and-down or in the left-and-right directions, swinging the tail 4 or driving the leg units 6A to 6D in concert synchronously for realizing such movements as running or walking.

Meanwhile, the degree of freedom of the joints of the mobile robot 1 is furnished by rotational driving of joint actuators, not shown, arranged on the respective axes. It should be noted that the number of the degree of freedom of the joints of the mobile robot 1 is optional and may be freely determined without departing from the scope of the present invention.

Figure 2:
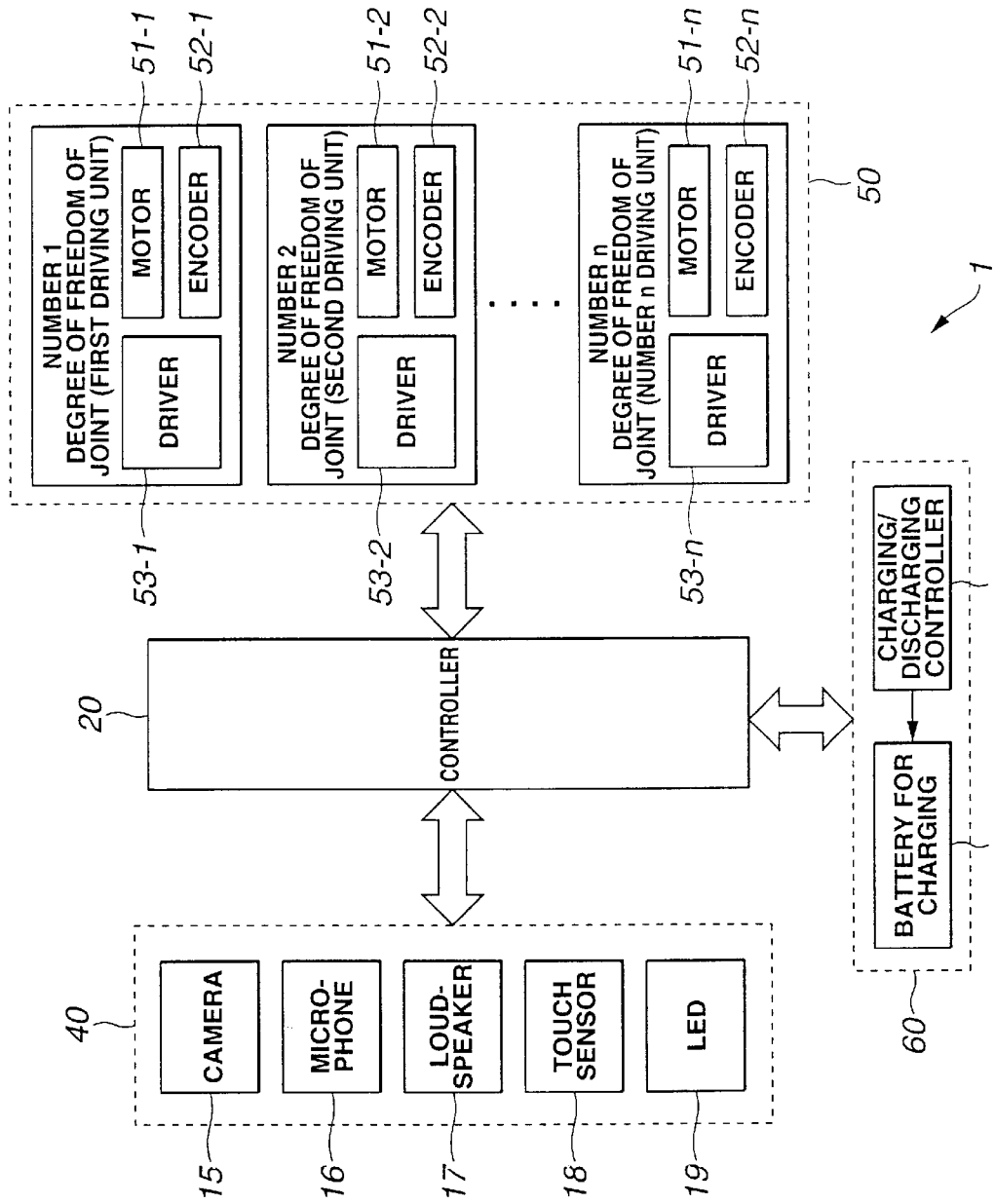
FIG. 2 schematically shows the structure of an electrical and controlling system of the mobile robot 1.

FIG. 2 schematically shows the structure of the electrical and controlling system of the mobile robot 1. As shown, the mobile robot 1 is made up of a controller 20, an input/output unit 40, a driving unit 50 and a power source unit 60, performing the comprehensive control of the overall operations and the processing of other data. These respective components are hereinafter explained.

The input/output unit 40 includes a CCD camera 15, equivalent to the 'eye' of the mobile robot 1, a microphone 16, equivalent to its 'ear', a touch sensor 18, equivalent to its tactile sense, and a plural number of sensors equivalent to the five senses. As the output unit, there are also provided a loudspeaker 17 equivalent to the mouth, and a number of LED indicators 19 forming facial expressions based on the combinations of lighting/extinguishment or the lighting timing. These output units are able to express the feedback to a user from the mobile robot 1 in a form other than mechanical movement patterns employing e.g., the legs.

The mobile robot 1, provided with the camera 15, is able to recognize the shape or the color of an optional object present in a workspace. The mobile robot 1 may also be provided with a receipt device for receiving transmitted waves, such a IR rays, sound waves, ultrasonic waves or electrical waves, in addition to visual means, such as cameras. In this case, the positions or orientation from the transmitting source may be measured based on an output of a sensor detecting the transmitted waves.

The driving unit 50 is a functional block for realizing mechanical movements of the mobile robot 1 in accordance with a preset movement pattern as commanded by the controller 20. The driving unit is comprised of driving units provided on each of the roll, pitch and yaw axes of the neck joint 7, tail joint 8, hip joints 11A to 11D and the knee joints 12A to 12D. In the illustrated instance, the mobile robot 1 has n degrees of freedom, at the respective joints, so that the driving unit 50 is made up of n driving units. Each driving unit is comprised of combinations of a motor 51 for producing rotational movements about preset axes, an encoder 52 for detecting rotational positions of the motor 51 and a driver 53 for adaptively controlling the rotational positions and rotational speeds of the motor 51 based on the outputs of the encoder 52.

The power source unit 60, as its name implies, is a functional module responsible for current supply to respective electrical circuits within the mobile robot 1. The mobile robot 1 of the instant embodiment is of an autonomous driving system, employing a battery. The power source unit 60 includes a battery for charging 61 and a charging/discharging controller 62 for supervising the charging/discharge state of the battery for charging 61.

The battery for charging 61 is of a 'battery pack' configuration comprised of plural nickel cadmium battery cells packed into a cartridge.

The charging/discharging controller 62 measures the terminal voltage or the charging/discharge current of the battery 61 and the temperature around the battery 61 to grasp its residual capacity to determine the start and end time points of charging. The charging start and end timings, as determined by the charging/discharging controller 62, are notified to the controller 20 for use as a trigger for the mobile robot 1 to start or terminate the charging operations.

The controller 20 is equivalent to a 'brain' and is loaded on, for example, the head unit 3 or the trunk unit 2 of the mobile robot 1.

Figure 3:
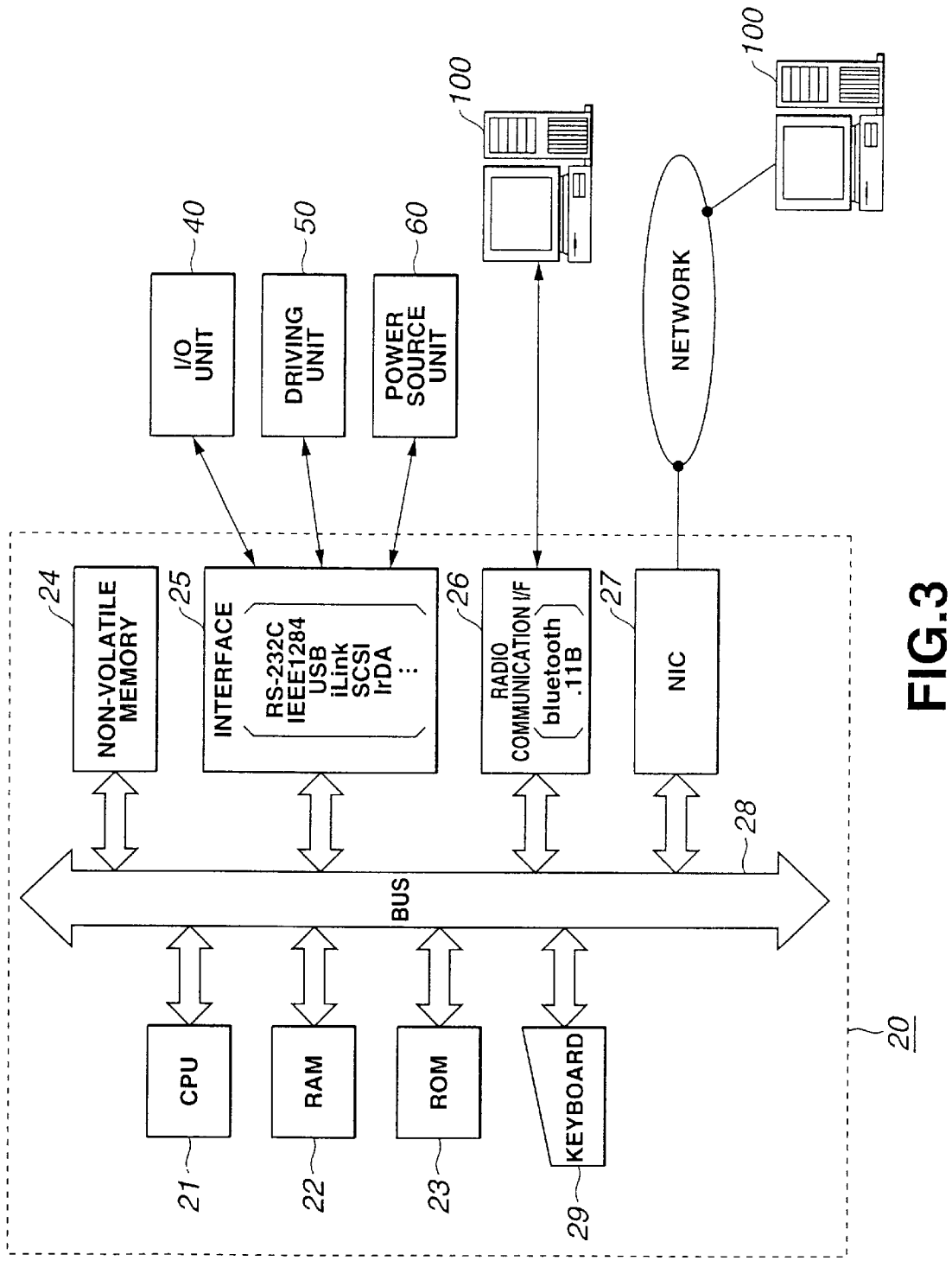
FIG. 3 is a detailed view of a controller 20.

FIG. 3 shows a more detailed structure of the controller 20. As shown therein, the controller 20 is comprised of a CPU (central processing unit) 21, as a main controller, interconnected over a bus with respective circuit components, such as memories, or peripheral circuits. The bus 27 is a common signal transmission path, inclusive of data buses, address buses and control buses. To each device on the bus, there is assigned a unique address (memory address or I/O address), so that, subject to addressing, the CPU 21 is able to communicate with a specified device on the bus 28.

A RAM (random access memory) 22 is a write memory, comprised of a volatile memory, such as DRAM (dynamic RAM), and is used for loading program codes, executed by the CPU 21, and for transient storage of work data by a program then running.

A ROM (read-only memory) 23 is a read-only memory for permanently recording programs or data. Among the program codes, stored in the ROM 23, there are, for example, a self-diagnosis test program, executed on power up of the mobile robot 1, and an operation control program for regulating the movements of the mobile robot 1.

Among the control programs for the robot 1, there are a 'sensor input processing program' for processing sensor inputs, such as inputs from the camera 15 or the microphone 16, a 'behavior command program' for generating the behavior, that is movement patterns, of the mobile robot 1 based on the sensor inputs and a preset movement model, and a 'driving control program' for controlling the driving of respective motors or speech outputs of the loudspeaker 17 in accordance with the so generated movement pattern. The generated movement pattern may include, in addition to the routine walking and running movements, the speech or movements rich in entertainment properties, such as [ote] (meaning 'raise hands'), [oazuke] (meaning 'raise fore feet', [osuwari] meaning 'sit down', or whining such as [waw-waw].

Among the control programs for the robot 1, there are a variety of programs for operating sequences, created and edited using an authoring tool. The authoring tool is booted in an environment in which a preset program is run on a computer system installed outside the robot 1. The authoring tool and the programs created and edited on the tool will be explained subsequently.

The non-volatile memory 24 is constructed by electrically erasable and overwritable memory devices, such as EEPROM (electrically erasable programmable ROM), and is used for non-volatile storage of data which should be updated sequentially. Among the data to be updated sequentially, there may, for example, be the security information, such as production numbers or secret keys, and a variety of models regulating the behavioral pattern of the robot 1.

An interface 25 is a device for establishing interconnection with equipment other than the controller 20 to enable data exchange. The interface 25 effectuates input/output of data with e.g. the camera 15, microphone 16 or the loudspeaker 17. The interface 25 also effectuates input/output of data and commands with respective drivers 53-1 . . . within the driver 50.

The interface 25 may also be provided with serial interfaces, such as RS (Recommended Standard)—232C, parallel interfaces, such as IEEE (Institute of Electrical and Electronics Engineers) 1284, or general-purpose interfaces for connection to computer peripherals, such as USB (Universal Serial Bus) interface, i-Link (IEEE1394) interface, SCSI (small computer system interface) or memory card interface, to run the programs or to effect data transfer with locally connected external equipment.

By way of another instance of the interface 25, an interface for IR communication (IrDA) may be used to effectuate radio communication with external equipment.

The controller 20 may also be provided with a radio communication interface 26 and a network interface card (NIC) 27 to effectuate proximity radio communication, such as 'Bluetooth' or '11B', or data communication with the external host computer 100 over LAN (Local Area network, e.g., Ethernet) or Internet. The transmission/receipt unit for radio communication is preferably provided on distal ends of the main body unit of the mobile robot 1, such as head unit 2 or tail 3, in light of reception sensitivity.

An objective of data communication between the mobile robot 1 and the host computer 100 is to compute complex operational control of the mobile robot 1, or to perform remote control, using computer resources, that is resources outside the robot 1, that is those on a remote computer.

Another objective of the data communication is to supply data or programs, necessary for program codes, such as movement model, necessary for movement control of the robot 1, from a remote device to the mobile robot 1 over the network.

Still another objective of the data communication is to effectuate downloading of the robot movement controlling program, created and edited on the host computer 100 using an authoring tool, as later explained, and debugging in real-time of the operation controlling program by cooperative operation in concert between the host computer 100 and the robot 1.

Yet another objective of the data communication is to transfer operational setting values, such as angular data, of respective joint actuators, prescribing the pose directly taught by the operator to the mobile robot 1, to the host computer 100. On the host computer 100, the 'pose' prescribed by the angular data of the respective joint actuators may be edited on the pose window to produce a key frame for motion. In short, the pose provided from the mobile robot 1 may be used for e.g., action editing.

The controller 20 may be provided with a keyboard 29, made up of ten keys and/or an alphabetical keys. The keyboard 29 is directly used for inputting a command by the user on the operating site of the robot 1, while being used for inputting the owner authentication information, such as a password.

The mobile robot 1 of the instant embodiment is able to execute autonomous movements, that is movements devoid of human intervention, by the controller 20 executing a preset movement controlling program. Moreover, the mobile robot 1 of the instant embodiment is provided with a picture inputting device, that is camera 15, a speech input device, that is microphone 16, or an input device equivalent to the five senses of the human being or animals, such as touch sensor 18, while being endowed with intelligence sufficient to enable intellectual or emotional movements to be executed responsive to these external inputs.

The mobile robot 1, constructed as shown in FIGS. 1 to 3, has the following characteristics:

(i) When commanded to transfer from a given orientation to another orientation, the mobile robot 1 is able to effectuate transition without transition directly through the respective orientations, but through unforced intermediate orientations, as provided from the outset.

(ii) When an optional orientation is reached through transition through preset orientations, a notice to that effect may be received.

(iii) The orientation control may be managed as the orientation is supervised independently from one unit, such as head or leg or tail unit, to another. That is, unit-based orientation control may be managed from unit to unit, apart from the orientation control of the robot 1 in its entirety.

(iv) It is possible to deliver parameters for specifying detailed operations of the movement commands.

Referring to FIG. 3, the mobile robot 1 of the instant embodiment is connected over a network to the external host computer 100. Alternatively, the mobile robot 1 may be connected to the host computer 100 by radio communication, such as Bluetooth or 11B proximity radio communication, or the like communication means.

On the host computer 100, a preset software execution environment is constructed, so that, under this environment, the authoring tool can be booted to create and edit the operating sequence of the robot 1 by interactive processing relatively easily and efficiently. The authoring tool will be discussed in detail subsequently.

Figure 4:
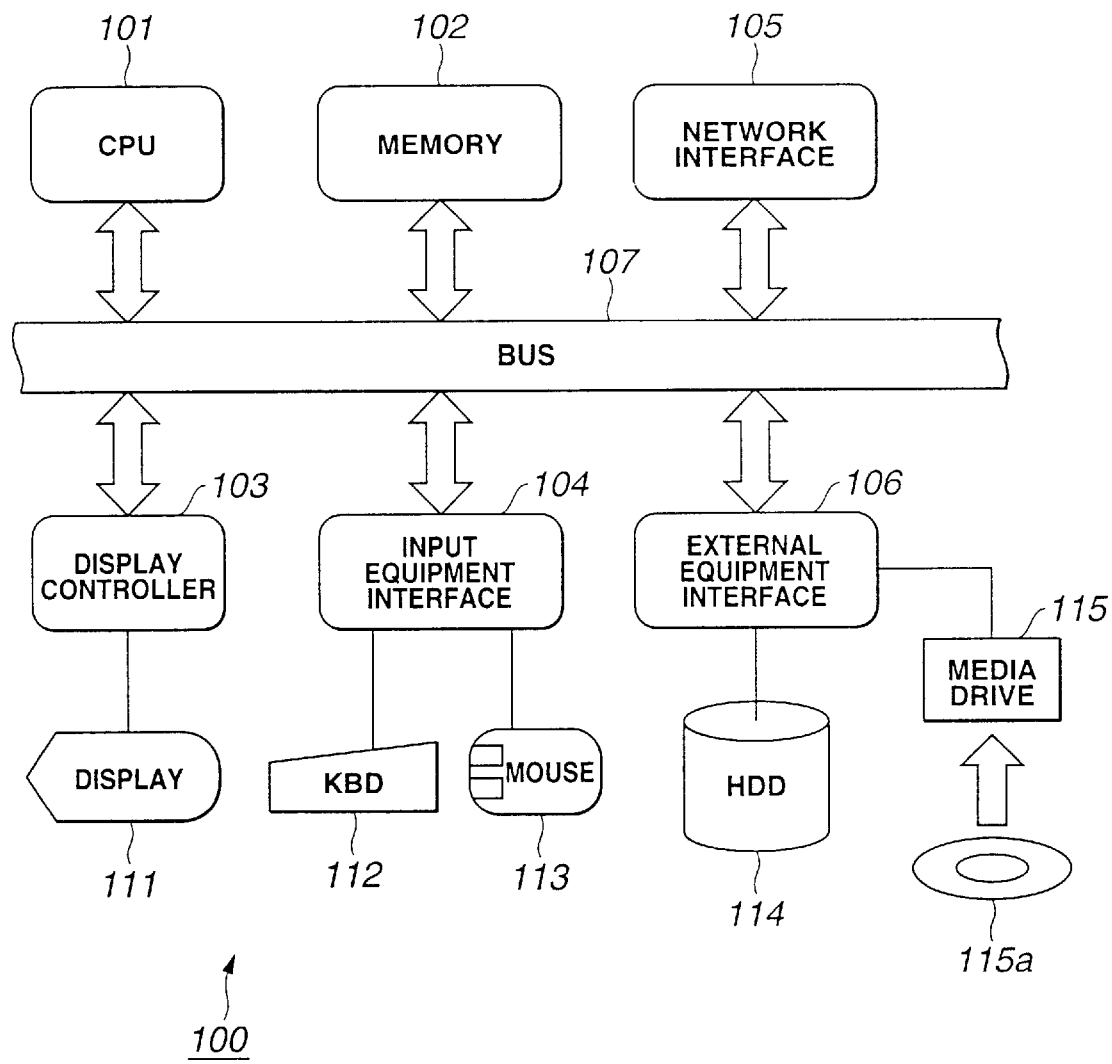
FIG. 4 schematically shows a hardware structure of a host computer 100.

FIG. 4 schematically illustrates an exemplary structure of the hardware of the host computer 100. The respective components of the computer 100 will be hereinafter explained in detail.

A CPU (central processing unit) 101, as a main controller of the system 100, is configured for executing various applications under control by an operating system (OS). Preferably, the OS furnishes a GUI (graphical user interface) environment. For example, the OS may be Windows98/NT of Microsoft Inc., USA.

As shown, the CPU 101 is connected over bus 107 to other equipment, not shown. The respective equipment on the bus 107 are afforded with unique memory addresses or I/O addresses, so that the CPU 101 is able to access the equipment based on these addresses. The bus 107 is a common signal transmission path, including data, address and control buses, and may be typified by a PCI (Peripheral Component Interconnect) bus.

A memory 102 is used for storage of program codes executed on the CPU 101 or transient storage of current operating data. It should be noted that the memory 102 shown may be a non-volatile memory or a volatile memory, as desired.

A display controller 103 is a dedicated controller for actually processing drawing commands issued by the CPU 101, and supports the bitmap drawing function equivalent to, for example, SVGA (Super Video Graphic Arrays) or XGA (eXtended Graphic Array). The drawing data, processed by the display controller 103, is transiently written in a frame buffer, not shown, and subsequently output to a display device 111, which display device 111 may, for example, be a CRT (Cathode Ray Tube) display or a liquid crystal display.

An input equipment interface 104 is a device for connecting user input equipment, such as keyboard 112 or mouse 113, to the system 100. The input equipment interface 104 is responsive to a coordinate command input through key input from a keyboard 112 or a mouse 113 to produce interrupt in the CPU 101.

A network interface 10S is able to connect the system 100 to a network, such as LAN (Local Area network), or to a proximity radio data communication, such as Bluetooth or 11B, in accordance with a preset communication protocol, such as Ethernet. The network interface 10S is furnished in general in a form of a LAN adapter card, and is used as it is loaded in a PCI bus slot on a motherboard, not shown.

In the embodiment shown in FIG. 3, the host computer 100 is interconnected to the robot 1 via radio data communication or a network. Of course, the computer 100 may also be connected to the robot 1 by other suitable communication means or data movement means. For example, data exchange or movement may also be performed using a recording medium, such as memory cards (memory stick).

On the network, plural host computers, not shown, are interconnected in a transparent state to form a distributed computer environment. On the network, software programs or data are distributed. For example, the authoring tool of the instant embodiment and the movement sequence program for robots, prepared and edited by the present authoring tool, or even the action files, motion files, sound files or LED operation files, as the movement files, may be distributed over the network. The network distribution service of these programs/data may be rendered either for pay or free of charge.

An external equipment interface 106 is a device for connecting an external device, such as a hard disc drive (HDD) 114 or a media drive 115, to the system 100. The external equipment interface 106 is designed so as to comply with interface standards, such as IDE (Integrated Drive Electronics) or SCSI (Small Computer System Interface).

The HDD114 is an external storage device, well-known per se, having a magnetic disc as a storage medium loaded thereon permanently, and is superior to other external storage devices as to storage capacity and data transfer rate. The mounting of a software program on the HDD 116 in an executable state is termed installation of the program on a system. In the HDD 114, program codes of the operating system to be executed by the CPU 101, application programs or device drivers are stored in a non-volatile fashion. For example, the authoring tool of the instant embodiment, or the movement sequence program, prepared and edited using the authoring tool, may be installed on the HDD 114.

On the other hand, a media drive 115 is a device in which a CD (Compact Disc), MO (magneto-optical disc) or a DVD (Digital Versatile Disc) is loaded for accessing the data recording surface. A portable medium 115a is used for backup mainly of software programs or data files in a computer readable data form or for moving the data between different systems, such as selling, circulating or distributing the data. For example, the authoring tool of the instant embodiment and the movement sequence program for robots, prepared and edited by the present authoring tool, or even the action files, motion files, sound files or LED operation files, may be physically circulated or distributed between different equipment, using the portable medium 115a.

Meanwhile, an example of the host computer 100, shown in FIG. 4, is a computer compatible with or inheriting a personal computer "PC/AT (Personal Computer/Advanced Technology)" manufactured by IBM of USA. Of course, computer systems equipped with other architectures may be used as the host computer 100 of the instant embodiment.

B. Structure of Authoring System

With the instant embodiment, the movement control program, comprised of a series of command/data, stating a preset movement pattern of the robot 1, may be created and edited, using an authoring tool booted on the computer 100. The movement control program, prepared and edited using this authoring tool, may be transferred to the robot 1, using radio communication means, such as Bluetooth or 11B, to execute debugging by concerted operation between the host computer 100 and the robot 1. That is, the authoring system for supporting the creation and editing of the movement control program is constructed by organic linkage between the host computer 100 and the robot 1.

Figure 5:
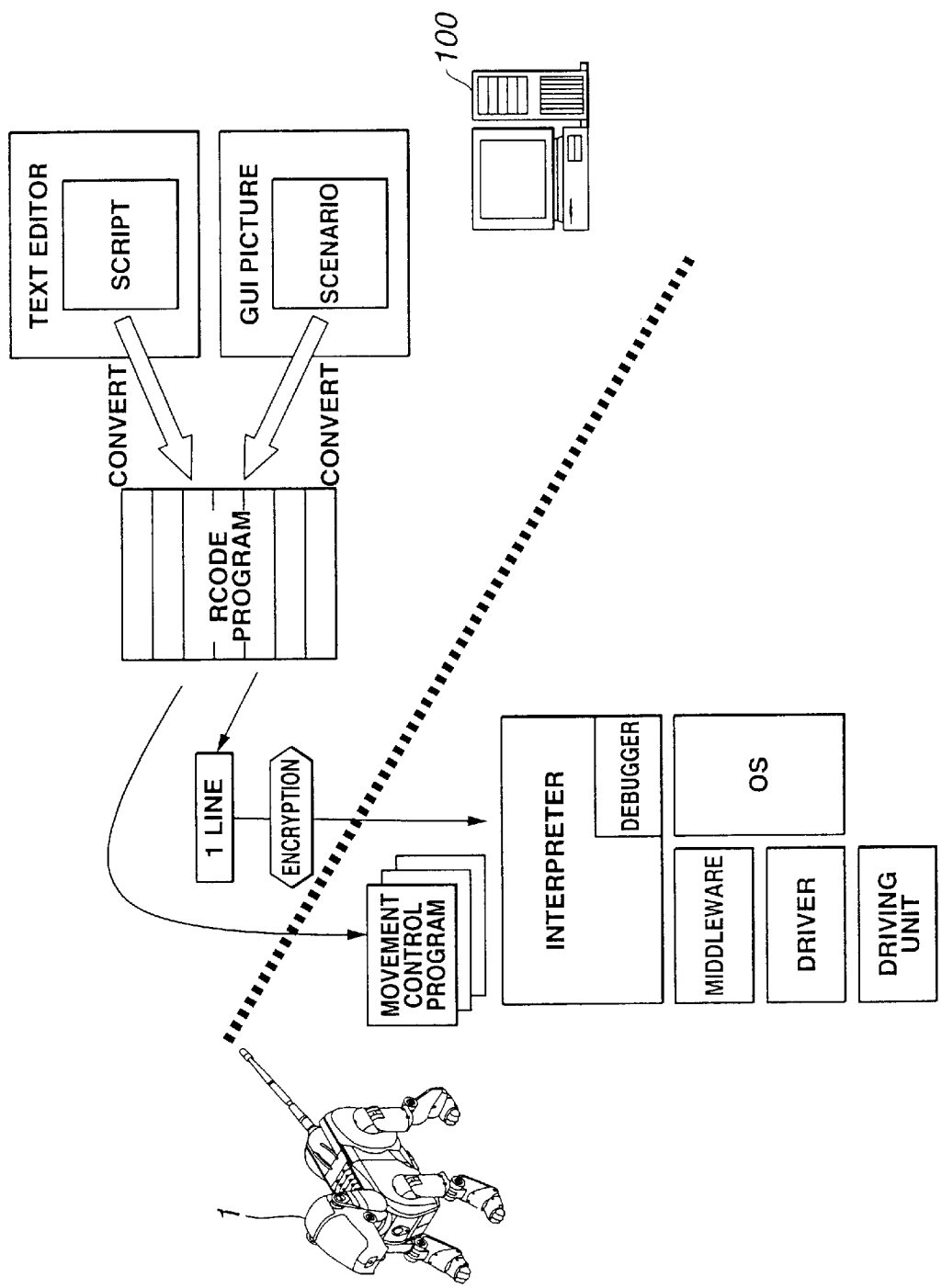
FIG. 5 schematically shows the hardware structure of the host computer 100.

FIG. 5 schematically shows the overall structure of the authoring system.

On the host computer 100, the user is able to prepare and edit a prescribed scenario for the mobile robot 1, by a mouse operation, using the GUI picture presented by the authoring tool. The GUI picture for preparing the scenario and the editing operation on the GUI picture will be explained in detail subsequently. Alternatively, the user is able to create and edit the movement control program for the robot 1, in a script form, such as a high grade language system, e.g., C-language, using a routine text editor etc.

The authoring tool converts the scenario, prepared and edited by the user on the GUI picture, or the movement control program of the script style, prepared and edited on the text editor, into an assembler-like pneumonic code, termed "RCODE".

The RCODE means a program language, formulated to control the robot 1 by simple commands. Since the RCODE also has a basic control structure, such as "IF" or "GO", it may also be used as a the lowest level script language for robot control.

The RCODE movement control program, created and edited on the side host computer 100, may be moved to the robot 1 using e.g., a storage medium, such as memory stick. In debugging the RCODE movement control program, the RCODE program is taken out row by row and encrypted so as to be sequentially transferred to the robot 1, using radio communication means, such as Bluetooth or 11B.

The robot 1, on the other hand, is provided with an interpreter/debugger, middleware, driver and an operating system (OS), as an environment for execution and debugging of the movement control program, stated in the RCODE etc.

The interpreter is a high level language program for reading-in, row-by-row, the program stated in the RCODE form, for executing the so read-in program. It should be noted that, when the RCODE program in the encrypted form is transmitted from the side host computer 100, as in debugging, it is necessary for an interpreter to decode it transiently before proceeding to interpretation and execution.

The debugger is a program for finding and correcting errors (bugs) in the RCODE program. That is, a debugger is able to halt the program running at a specified row or to refer to the contents of the memory or the variable at such time.

The middleware is a set of software modules furnishing basic functions of the robot 1. The structure of each module is affected by mechanical and electrical properties of the robot 1, or hardware attributes, such as specifications or shape. Functionally, the middleware is classified into the middleware of the recognition system and that of the output system.

The middleware of the recognition system is an engine for receiving and processing crude data from the hardware, such as picture or speech data or detection data obtained from other types of the sensor, through a virtual robot. That is, the middleware of the recognition system performs speech or color recognition or detection of distance, orientation, contact, motion or color to acquire the results of recognition, which are notified to an upper application layer, that is a movement control program.

On the other hand, the middleware of the output system furnishes the functions, such as reproduction of the walking and movements, synthesis of output sound or control of the turning on/off of LED indicators. That is, the middleware of the output system receives behavioral schedules, mapped out on the application layer, to generate the servo control values of the robot, output sound, output light (LED) or output speech, on the joint basis, from one function of the robot 1 to the next, to realize the various actual performances on the robot 1.

The driver is a program code for performing operations of the respective joint actuators and other hardware operations.

In the present embodiment, the middleware and the driver are implemented by the object oriented programs. The object orientation based software is handled in terms of a module termed an 'object' which basically is data and a processing sequence for the data, unified together. One software is completed by preparing or combining plural objects as necessary. By and large, the object oriented programming is felt to help improve software development and maintenance.

An operating system (OS) exercises control of data communication between these objects and of execution of other programs. The OS is also implemented by an objet oriented program.

C. Creation and Editing of Operating Program for Robots Employing Authoring Tool The movement scenario, created using the authoring tool of the instant embodiment, is made up of creation and editing of the 'behavior' and creation and editing of the 'action', with the resultant product being termed a 'project'. In this project is set the configuration or CPC (configured peripheral component) of the mobile robot 1, that is the hardware constituent information, comprised of the combination of the trunk, head and legs of the mobile robot 1.

The project is made up of the behavior file, action file, motion file, sound file and LED operation file. The behavior is composed of combination of actions. Each action is made up of respective contents, such as motion, sound and the LED operations.

The motion file is a file which prescribes the movements of the respective joint actuators of the mobile robot 1. In the instant embodiment, the motion is prescribed by chronologically arranging two or more key frames delineating the mobile robot 1 striking a pose on a GUI editing picture. The motion editing operation on the GUI editing picture will be explained later in detail.

The sound file is acoustic data for speech outputting via loudspeaker 17, and is constructed e.g., as MIDI (Musical Instrumental Digital Interface) or WAVEform file. For example, the acoustic file, stated in the MIDI form, is designed to represent music not as the information of the sound itself, but on converting the performance information, such as loudness, length, timbre or effect into numerical data. In the instant embodiment, the numerical data of the MIDI form, constituting the sound, are acted on through the GUI editing picture for editing the performance information, as will be explained subsequently in detail.

The LED movement file is data for prescribing the combination of the turning on/off of the plural LED indicators 19, and is used for forming facial expressions. In the instant embodiment, the LED operation file is stated in the MIDI form, and is designed to be edited in desired manner through the GUI editing picture. The editing operation of the GUI editing picture will be explained in detail subsequently.

The motion, sound and the LED operations represent constituent elements of an action, and are chronological data changing with lapse of time. For accurate reproduction of an action, these constituent elements must be temporally synchronized with one another. In the present embodiment, each file can be edited so that the motion and the sound as well as the turning on/off of the plural LEDs will be synchronized with one another on the time axis, as will be explained in detail subsequently.

An action is constructed by unifying the respective contents, that is the motion file, sound file and the turning on/off of the plural LEDs. One action file is a command reproduced in approximately ten seconds, and is also termed 'semantics'. In the present embodiment, there is provided a working environment for action edition in which time lines are utilized on the GUI editing picture to achieve the synchronization between the respective contents with much ease, as will be explained subsequently. The respective contents can not only be processed as individual data, but may be handled as an action, that is in a form unified with other contents.

The behavior is a file prescribing the behavior of the mobile robot 1 and which is constituted by arraying two or more commands, that is actions. An action is reproduced in one direction from the beginning until the end. Conversely, with the behavior, the action reproducing sequence can be prescribed. In addition, subroutines may also be defined by branching based on conditions or probability or by forming plural commands or actions into a box. Thus, with the behavior, it is possible to state a higher and more complex movement sequence of the mobile robot 1 than with the action.

Figure 29:
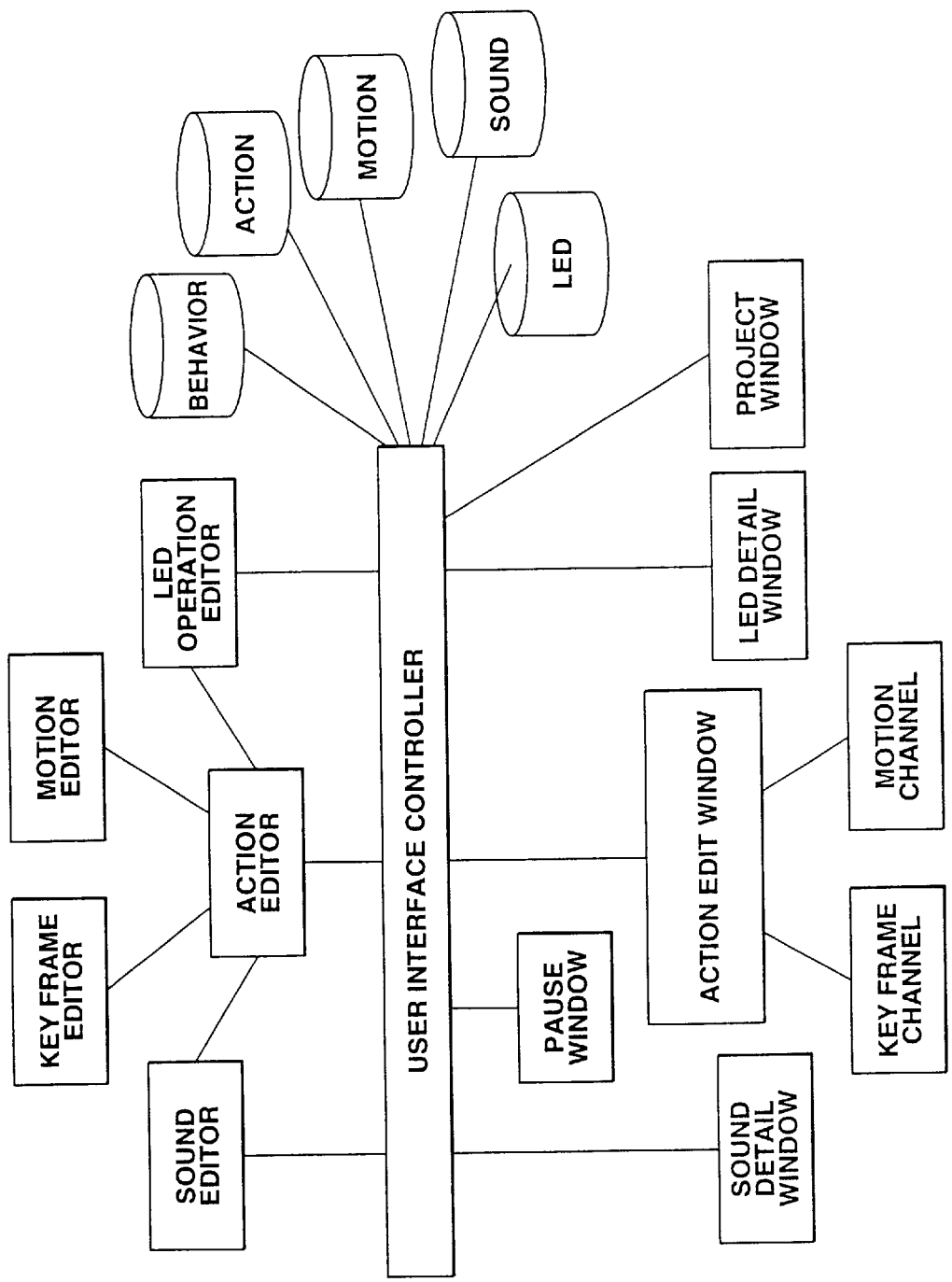
FIG. 29 is a block diagram of the authoring system.

FIG. 29 schematically shows a functional structure of the authoring system. The authoring system of the present embodiment, shown therein, is particularly designed for editing an action, and is made up by an action editor, a keyframe editor, a motion editor, a sound editor, an LED movement editor and a user interface controller for achieving the editing operation by the user with these functional modules by dialog on the GUI picture.

The action editor is a functional module for editing the motion file, the sound file and the LED movement file with synchronization on the time axis. The action editor presents, through the user interface controller, the joint movement (motion) along the time axis of the mobile robot 1, and an action editing window, for setting the timing of the sound and the LED operations, to the user. The action editing window, including an editing area, made up by a time-line style table for setting the various files on the time axis, will be explained in detail subsequently.

The keyframe editor is a functional module for editing a keyframe, that is a picture frame delineating a pose of the mobile robot performing a motion at a relevant time point. The key frame editor is invoked responsive to the user's actuation on the action editor and accepts the editing operation by the user through a keyframe channel opened on the action editing window. The keyframe channel, in which thumbnails representing the keyframe are placed at relevant positions on the time axis, will be explained in detail subsequently.

The motion editor is a functional module for editing the motion, that is chronological movements of the respective joint actuators making up the mobile robot. The motion editor is invoked responsive to the user's actuation on the action editor and accepts the editing operation by the user through a motion channel opened on the action editing window. The motion channel, in which each timing chart stating the chronological movements of the respective joint actuators is listed up (in a tree-view) in a living body simulating model, will be explained in detail subsequently.

The motion editor presents, through the user interfacing unit, the pose window for editing the pose of the mobile robot 1 on a 3D display screen, and a motion previewer, for pre-viewing the finished motion, to the user. The pose window and the motion previewer will be explained in detail subsequently.

The sound editor is a functional module for setting details of the sound as one of the constituent elements of an action. In the present embodiment, the sound is treated in the MIDI or WAVE form. The sound editor presents to the user the sound detail window, usable for setting details of the sound along the time axis, through user interface controller. The sound detail window includes an editing area, comprised of a two-dimensional time-line style table, made up by a time axis in the horizontal direction and by a channel in the vertical direction. The sound detail window will be explained later in detail. The contents as set on the sound detail window are used for demonstration on a sound channel, as later explained, within the action editing window.

The LED movement editor is a functional module for setting details of the LED operation as one of the constituent elements of the action. In the present embodiment, the LED movement is treated in the MIDI style. The LED movement editor presents, through the user interface controller, an LED detail window usable for setting details of the LED movements along the time axis, to the user. The LED detail window, including an editing area, comprised of a two-dimensional time-line style table, made up by a time axis in the horizontal direction and by a channel in the vertical direction, will be explained subsequently. The contents as set on the LED detail window are used for demonstration on an LED movement channel, as later explained, within the action editing window.

In editing the project, the user interface controller presents a project window to the user.

The user interface controller is responsive to the user command, input through each editing window, to access each file system or database supervising the behavior file, action file, motion file, sound file and the LED movement file.

The sequence of processing operations for a user to create and edit the movement scenario of the mobile robot 1 on the authoring system of the present invention is now explained in detail.

Figure 6:
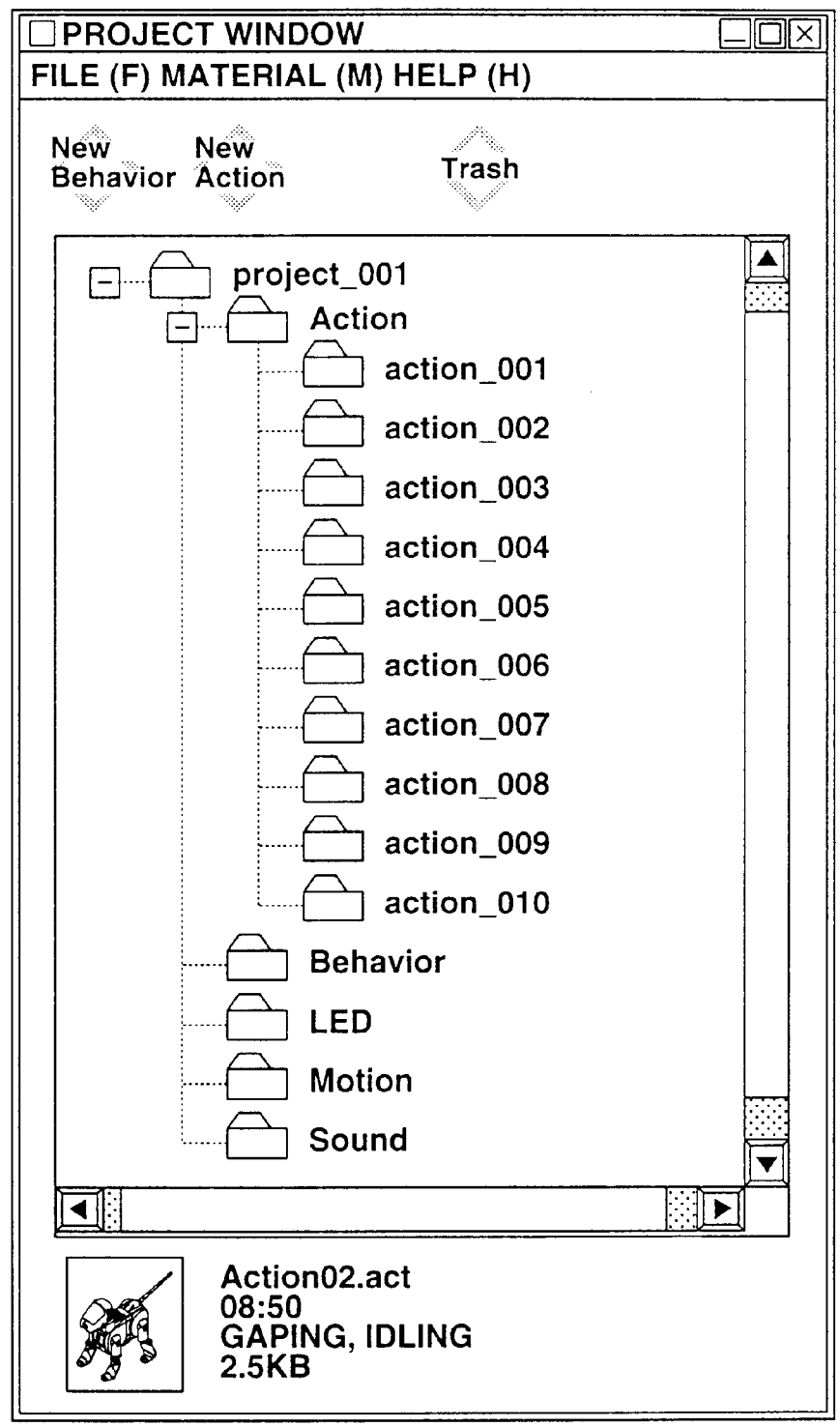
FIG. 6 shows a project window.

In editing the project, a 'project window' shown in FIG. 6 is demonstrated. The project window includes a title bar, a menu bar, a tool bar and a list display area. The project window is formed e.g., by an SDI (Single Document Interface) main window. The SDI is a user interface of the type operating for opening one document in one window.

As shown, a list of files, namely the behavior file, action file, motion file, sound file and the LED movement file, used for editing the behavior and the action, is displayed in a tree style in the project window.

Figure 9:
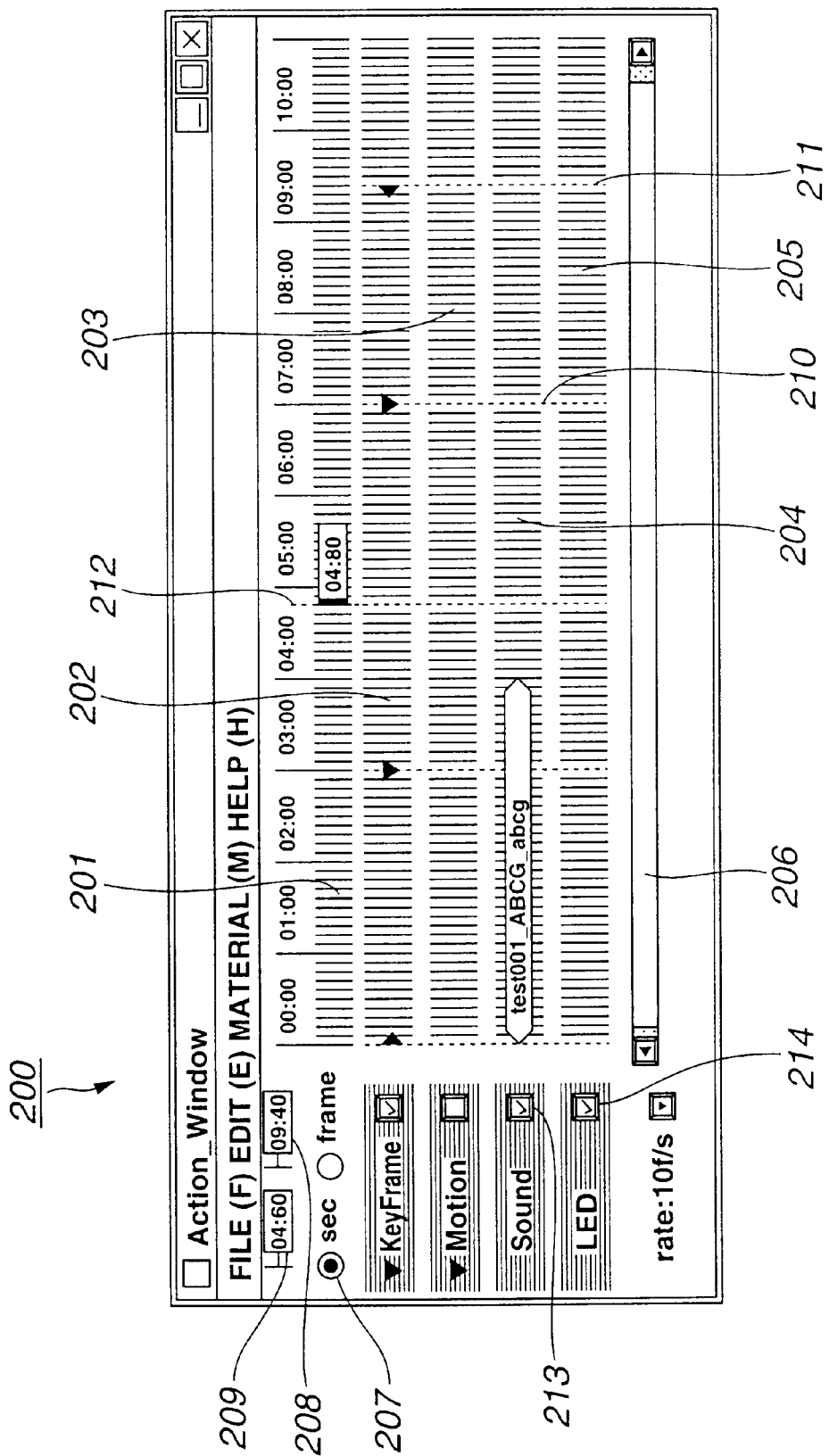
FIG. 9 shows an action editing window.
Figure 28:
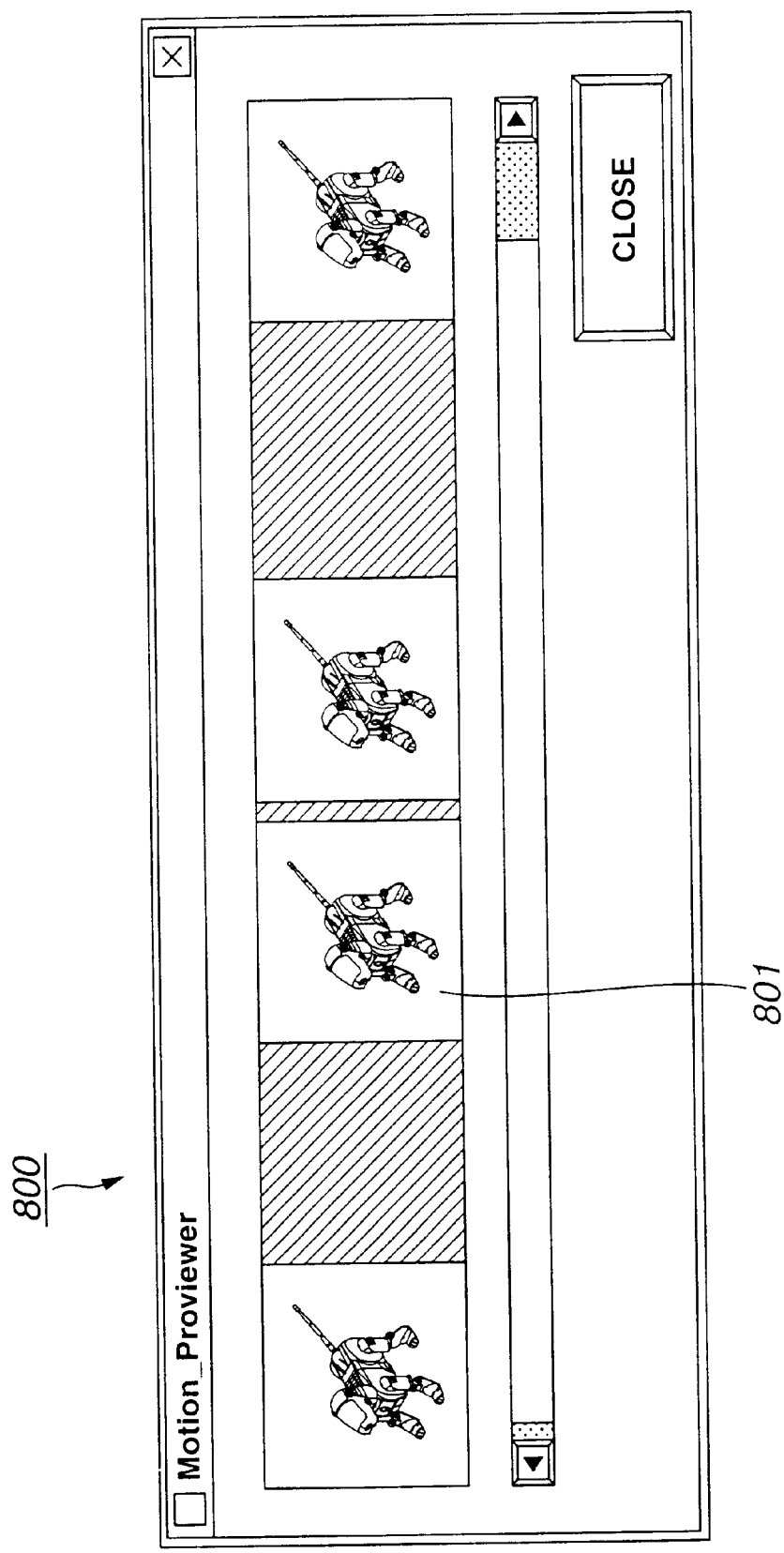
FIG. 28 schematically shows the structure of motion previewer for previewing the motion.

If a listed item of the behavior or the action is double-clicked, the relevant editing window, explained later with reference to FIG. 9, is opened. If the thumbnail of the lower left motion is double-clicked, the motion preview window, later explained with reference to FIG. 28, is opened.

The project window has the function of displaying the detailed information concerning the item as selected on the tree list.

The detailed information concerning the behavior includes thumbnails, filenames, items of classification, epitomized description of operation and operating time. The detailed information concerning the action includes the thumbnail (initial pose), filename, operating time, initial pose, end pose or the file capacity. The detailed information concerning the motion includes the thumbnail (initial pose), filename, operating time, initial pose, end pose and the file capacity. The detailed information concerning the sound includes the thumbnail (icon representing the sound), filename, operating time and the file capacity. The detailed information concerning the LED operation includes the thumbnail (icon representing the sound), filename, operating time and the file capacity.

On top of the project window, there are provided a menu bar, including menus 'file', 'edit', 'material' and 'help'.

If the menu 'file' is selected, a pull-down menu, made up of respective sub-menus 'new project', 'open project', 'save project', 'save new project' and 'end', appears (see FIG. 7).

If the sub-menu 'new project' is selected, a new project is produced. If an unsaved project is already opened, a dialog prompting the user to confirm whether or not the project is to be saved appears.

If the sub-menu 'open project' is selected, the pre-existing project file is opened. If the unsaved project is already opened, a dialog appears to prompt the user to confirm whether or not the project is to be saved, in the manner as described above.

If the sub-menu 'save project' is selected, the relevant project file is overwrite-saved. If the file has not been saved, a file setting dialog, as later explained, appears, as in saving a new project, to prompt the user to input the filename.

If the sub-menu 'save new project' is selected, a file setting dialog appears to prompt the user to input the filename.

If the sub-menu 'end' is selected, this project window is closed. If the project file in the window has not been saved, a dialog appears to prompt the user whether or not this is to be saved.

If the menu 'material' is selected, a pull-down menu, made up of sub-menus 'create new behavior', 'create new action', 'read-in material' and 'delete material' appears (see FIG. 8).

If the sub-menu 'create new behavior' is selected, the behavior editing window is opened in a novel state. This behavior is automatically added to the list of the behavior in the project window. The behavior editing is not directly related to the purport of the present invention and hence is not explained in further detail herein.

If the sub-menu 'create new action' is selected, the action editing window 200, as later explained and as shown in FIG. 9, is opened in a novel state. This action is automatically added to the list of the actions in the project window.

If the sub-menu 'read-in material' is selected, a file specifying dialog appears to register a usable material file in the project. This operation is the same as that occurring on drag-and-drop from the explorer.

If the sub-menu 'delete material' is selected, valid display occurs only when the item is in a selected state. On selection, the item is deleted from the list in the project window. It should be noted that it is not the file that is deleted from the directory.

The menu 'help' includes sub-menus such as topic, support web or version information.

Below the menu bar, there are mounted tool buttons for instantaneously invoking frequently used functions, such as create new behavior button (New Behavior), create new action button (New Action) or trash (Trash).

The create new behavior button is equivalent to the sub-menu 'create new behavior' in the menu 'material'. The create new action button is equivalent to the sub-menu 'create new action' in the menu 'material'. The trash is equivalent to the sub-menu 'delete material' in the menu 'material'.

In the project window, the so-called drag-and-drop operation is allowed. That is, a file icon on the explorer may be dragged to an optional site of the tree for direct registration.

Moreover, the material on the tree list can be dragged to any desired editing window. The action can be dragged to the behavior window, whilst the motion, sound and LED operations can be dragged tot the action window.

FIG. 9 schematically shows the structure of an action editing window 200. On this action editing window 200, the timings of the joint movement (motion) and the those of the sound and LED operations of the mobile robot 1 along time axis may be set. The results of editing on the editing window are saved as action files having the extension "act". Meanwhile, in the case of the authoring system in which different action editing windows 200 are provided depending on the difference in the model of the mobile robot 1 (or on the difference of the information on the hardware structure comprised of the combination of CPC components), the action editing windows 200 may be adapted to be switched responsive to the model selection operations by the user.

As shown, the action editing window 200 is made up of a title bar, a menu bar and an editing area for setting the motion data, sound data and the LED operation data on the time axis.

In the menu bar, there are provided menus 'file', 'material' and 'help'.

Figure 10:
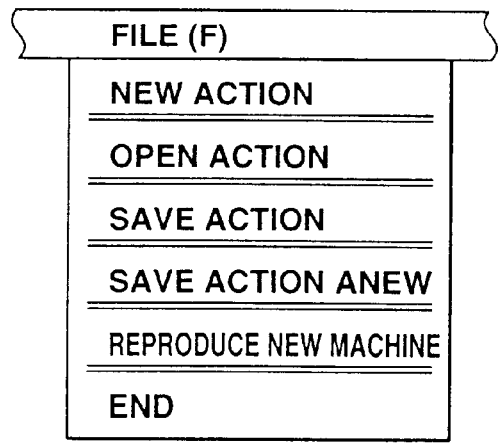
FIG. 10 shows a submenu 'file' in an action editing window.

If the menu 'file' is selected, there appears a pull-down menu comprised of sub-menus 'new action', 'open action', 'save action', 'sve new action', 'replay on actual machine' and 'close' (see FIG. 10).

If the sub-menu 'new action' is selected, a novel action is produced. If already an unsaved action is opened, there appears a dialog prompting the user to confirm whether or not the action is to be saved.

If the sub-menu 'open new action' is selected, a pre-existing action file is opened. If an unsaved action has already been opened, there appears a dialog prompting the user to confirm whether or not the action is to be saved.

If the sub-menu 'save action' is selected, the relevant action file is overwrite-saved. In case of an unsaved file, a file setting dialog appears, as in the case of new action saving, as later explained, to prompt the user to input the filename.

If the sub-menu 'save new action' is selected, a file setting dialog appears to prompt the user to input a filename.

If the sub-menu 'replay on actual machine' is selected, the action file, edited on the action editing window 200, shown in FIG. 9, is transferred to the actual machine, that is to the mobile robot 1, to really reproduce the file by way of a trial. The action file may be transferred to the mobile robot 1 via near radio data communication, such as Bluetooth, or moved between devices through the intermediary of a medium, such as a memory card.

If the sub-menu 'close' is selected, this action editing window 200 is closed. If an action file(s) in the window is as yet not saved, a dialog appears to prompt the user to confirm whether or not this file is to be saved.

Figure 11:
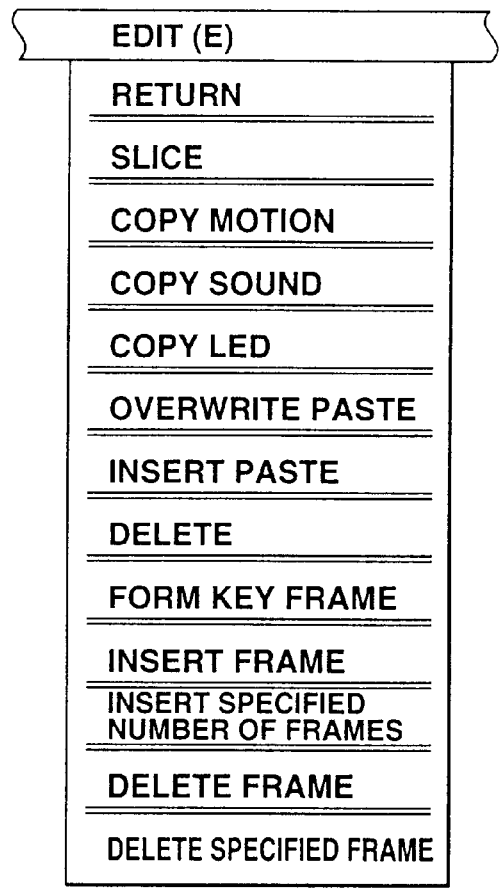
FIG. 11 shows a submenu item of a menu 'editing' in the action editing window.

If the menu (edit) is selected, there appears a pull-down menu comprised of sub-menus 'return', 'slice', 'copy motion', 'copy sound', 'copy LED'. 'overwrite paste', 'insert paste', 'delete', 'form keyframe'. 'insert frame', 'insert number of specified frames', 'delete frames' and 'delete specified frame' (see FIG. 11).

If the sub-menu 'revert' is selected, undo processing is carried out beginning from the near-by operation.

If the sub-menu 'slice' is selected, the motion over a selected time span, if any, is cut, whereas, if there is no such time span, the motion, sound and the LED operations of the frame in question, are cut. Actually, the so cut data is transiently stored in a clipboard. By this cutting, not the frame itself but the information concerning the contents of the frame is lost.

If the sub-menu 'copy motion' is selected, the motion over a selected time span, if any, is cut. Actually, the so cut data is transiently stored in a clipboard.

If the sub-menu 'copy sound' is selected, the sound over a selected time span, if any, is cut. Actually, the so cut data is transiently stored in a clipboard.

If the sub-menu 'copy LED' is selected, the LED operation over a selected time span, if any, is copied. Actually, the so copied data is transiently stored in a clipboard:

If the sub-menu 'overwrite paste' is selected, the contents stored in the clipboard are pasted at the current time point.

If the sub-menu 'insert paste' is selected, the contents stored in the clipboard are inserted and pasted at the current time point.

If the sub-menu 'delete' is selected, the motion over a selected time span, if any, is deleted, whereas, if there is no such time span, the motion, sound and the LED operation, that is the action, of the frame in question is deleted.

If the sub-menu 'form keyframe' is selected, the frame of the current time point is formed into a key frame. That is, a pose can be generated on interpolation between pre-existing keyframes and formed into new keyframe data.

If the sub-menu 'insert frame' is selected, the frame(s) for a selected time span, if any, is inserted at the current time point. As a result of the frame insertion operation, the overall time of the action is elongated by the specified frame time period.

If the sub-menu 'insert specified number of frames' is selected, there appears a numerical input dialog so that a number of frames corresponding to the numerical value as input on the dialog are inserted. As a result of the insertion of the specified number of frames, the overall time of the action is elongated by the specified frame time period.

If the sub-menu 'delete frame' is selected, the frame(s) corresponding to a selected time span, if any, is deleted from the current time point. At this time, frames lying towards left in the editing area are padded. As a result of the frame deletion, the overall time of the action is shorter by the time corresponding to the deleted frames.

If the sub-menu 'delete specified frames' is selected, there appears a numerically input dialog to delete the frames corresponding to the numerical figure input on the dialog. The numerical figures as input are time-specifying figures. At this time, frames lying towards left in the editing area are padded. As a result of the frame deletion, the overall time of the action is shorter by the time corresponding specified frame time.

Figure 12:
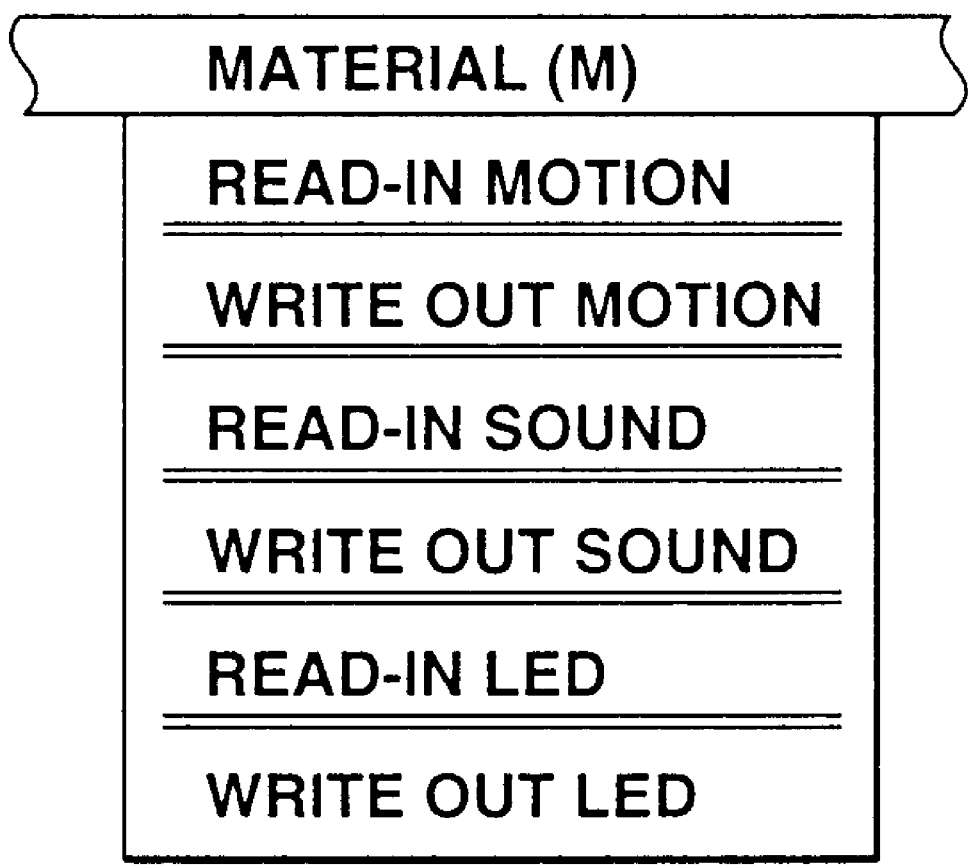
FIG. 12 shows a submenu item of a menu 'material' in the action editing window.

If the menu 'material' is selected, there further appears a pull-down menu, comprised of 'read-in motion', 'write-out motion', 'read-in sound', 'write-out sound', 'read-in LED' and 'write-out LED' (see FIG. 12).

If the sub-menu 'read-in motion' is selected, the motion file is read-in from the specified site of storage, such as local disc, so as to be inserted at the current time point on a motion channel 203 in the editing area as later explained. During this read-in operation, the keyframe included in the motion file directly becomes a keyframe.

If the sub-menu 'write out motion' is selected, the motion of the selected time span is stored as the motion file in the site of storage specified, such as local disc.

If the sub-menu 'read-in sound' is selected, the sound file is read-in from the site of storage as specified, such as local disc, and is inserted at the current time point on a sound channel 204 in the editing area.

If the sub-menu 'write-out sound' is selected, the sound of the specified time span is stored as a sound file of, for example, the MIDI style, in the specified storage site, such as local disc.

If the sub-menu 'read-in LED' is selected, the LED operating file is read-in from the site of storage as specified, such as local disc, and is inserted at the current time point on an LED channel in the editing area, as later explained.

If the sub-menu 'write-out sound' is selected, the sound of the specified time span is stored as an LED file of, for example, the MIDI style, in the specified storage site, such as local disc.

In the menu 'help', there are provided sub-menus, such as topics, support webs and the version information.

Reverting to FIG. 9, the editing area in the action editing window 200 is explained. As shown, the editing area of the action editing window 200 is a two-dimensional time line style table comprised of the time axis in the horizontal direction and the channel in the vertical direction. Within the time line table, there are a time ruler 201, a keyframe channel 202, a motion channel 203, a sound channel 204 and an LED operation channel 205.

With the time ruler 201, real-time display can be switched to display of the number of frames, and vice versa, using a unit switching radio button 207. In the instance shown in FIG. 9, real-time display is selected. The real-time display is graduated in seconds and milliseconds, each being of two digits. The relationship between display in real-time display and display on the time ruler 201 is shown by the following equation 1:

$$00:00 = 0 \text{ sec}$$

$$15:23 = 5 \text{ sec } 23$$

$$13:87 = 13 \text{ sec } 87. \qquad \text{(Equation 1)}$$

In the graduation of the time ruler 201 in the representation in the number of frames, the number of frames is in four digits. The maximum number of frames of 9999 is approximately 160 seconds.

The frame width setting on the picture in each case of the real tine display in second and display in the number of frames, with the unit being f, is as shown in the following Tables 1 and 2:

TABLE 1

Real Time Display

| setting value (display) | possible display time (seconds) | reading of graduations (numerical figure) | auxiliary graduations |
|---|---|---|---|
| 1 frame = 0.5 pixel (0.5 px/fr) | ca. 20.12 seconds | 02:00 (each 62.5 px) | 00:20 (each 6.25 px) |
| 1 frame = 1 pixel (1 px/fr) | ca. 10.24 seconds | 01:00 (each 62.5 px) | 00:10 (each 6.25 px) |
| 1 frame = 2 pixel (2 px/fr) | ca. 5.12 seconds | 01:00 (each 125 px) | 00:10 (each 12.5 px) |
| 1 frame = 3 pixel (3 px/fr) | ca. 3.41 seconds | 00:50 (each 93.75 px) | 00:05 (each 9.375 px) |
| 1 frame = 4 pixel (4 px/fr) | ca. 2.56 seconds | 00:50 (each 125 px) | 00:05 (each 12.5 px) |
| 1 frame = 6 pixel (6 px/fr) | ca. 1.7 seconds | 00:25 (each 93.75 px) | 00:025 (each 9.375 px) |
| 1 frame = 8 pixel (8 px/fr) | ca. 1.28 seconds | 00.25 (each 125 px) | 00:025 (each 12.5 px) |

TABLE 2

Display in Number of Frames

| setting value (display) | possible display time (seconds) | reading of graduations (numerical figure) | auxiliary graduations |
|---|---|---|---|
| 1 frame = 0.5 pixel (0.5 px/fr) | ca. 20.12 seconds | 200 (each 100 px) | 20 (per 10 px) |
| 1 frame = 1 pixel (1 px/fr) | ca. 10.24 seconds | 100 (each 100 px) | 10 (per 100 px) |
| 1 frame = 2 pixel (1 px/fr) | ca. 5.12 seconds | 50 (each 100 px) | 5 (per 10 px) |
| 1 frame = 3 pixel (1 px/fr) | ca. 3.41 seconds | 25 (each 75 px) | 2.5 (per 7 px) |
| 1 frame = 4 pixel (1 px/fr) | ca. 2.56 seconds | 25 (each 100 px) | 2.5 (per 10 px) |
| 1 frame = 6 pixel (1 px/fr) | ca. 1.7 seconds | 10 (each 60 px) | 5 (per 6 px) |
| 1 frame = 8 pixel (1 px/fr) | ca. 1.28 seconds | 10 (each 80 px) | 1 (per 8 px) |

Meanwhile, the possible display time in seconds means an approximate number of seconds for the maximized window size in a display in SVGA(Super Video Graphic Array). By the scrolling of the time axis (operation of a horizontal scroll bar 206, the time ruler 201 scrolls properly.

The time ruler 201 includes an end time display field 208 and a current time display field 209, in addition to the unit switching radio button 207.

In the end time display field 208, a time representing numerical value, indicating the end time of an action being edited, that is the operating time, is displayed (in the illustrated example, "09:40" (=9 seconds 40), is displayed). In the current time display field 209, a time representing numerical value, indicating the current position, is displayed (in the illustrated example, "04:60" (=4 seconds 60) is displayed). These fields are editable text fields, such that, if a meaningful time representing numerical value is input, it becomes the end time, such that the final keyframe is moved or the current time is moved to that position.

On the time ruler 201, an 'initial pose specifying popup menu', not shown, for specifying the initial pose, a 'final pose specifying popup menu', not shown, for specifying the final pose, and the 'time width changing popup menu', again not shown, for changing the interval of the time ruler 201, may be invoked.

In the editing area, a 'keyframe line 210' an 'end time line 211' and a 'current time line 212' are displayed.

A keyframe line 210, indicating the time of keyframes 202a to 202b, as later explained, is displayed as intersecting the respective channels. Thus, the user is able to continue the editing operation as he or she checks for synchronization between the motion, sound and the LED operations.

On the other hand, since the end time line 211, indicating the end time of an action being edited, is displayed as intersecting the respective channels, the user is able to visually grasp the time range being edited. The end time line 211 may be grasped as the final pose keyframe line.

Moreover, the current time line 212, indicating the current time, is displayed as intersecting the respective channels. Basically, when any one channel is clicked, the current time is moved to such clicked position.

If the preview window, not shown, is opened in the editing area, a three-dimensional image of the mobile robot 1 at the current time is displayed at all times. This three-dimensional image is obtained by the authoring system automatically generating an interpolated frame for the current time and carrying out picture processing, such as coordinate transformation, based on e.g., the movements of the respective joint actuators.

The keyframe channel 202 is an area in which to display the keyframe along the time axis prescribed by the time ruler 201.

Figure 13:
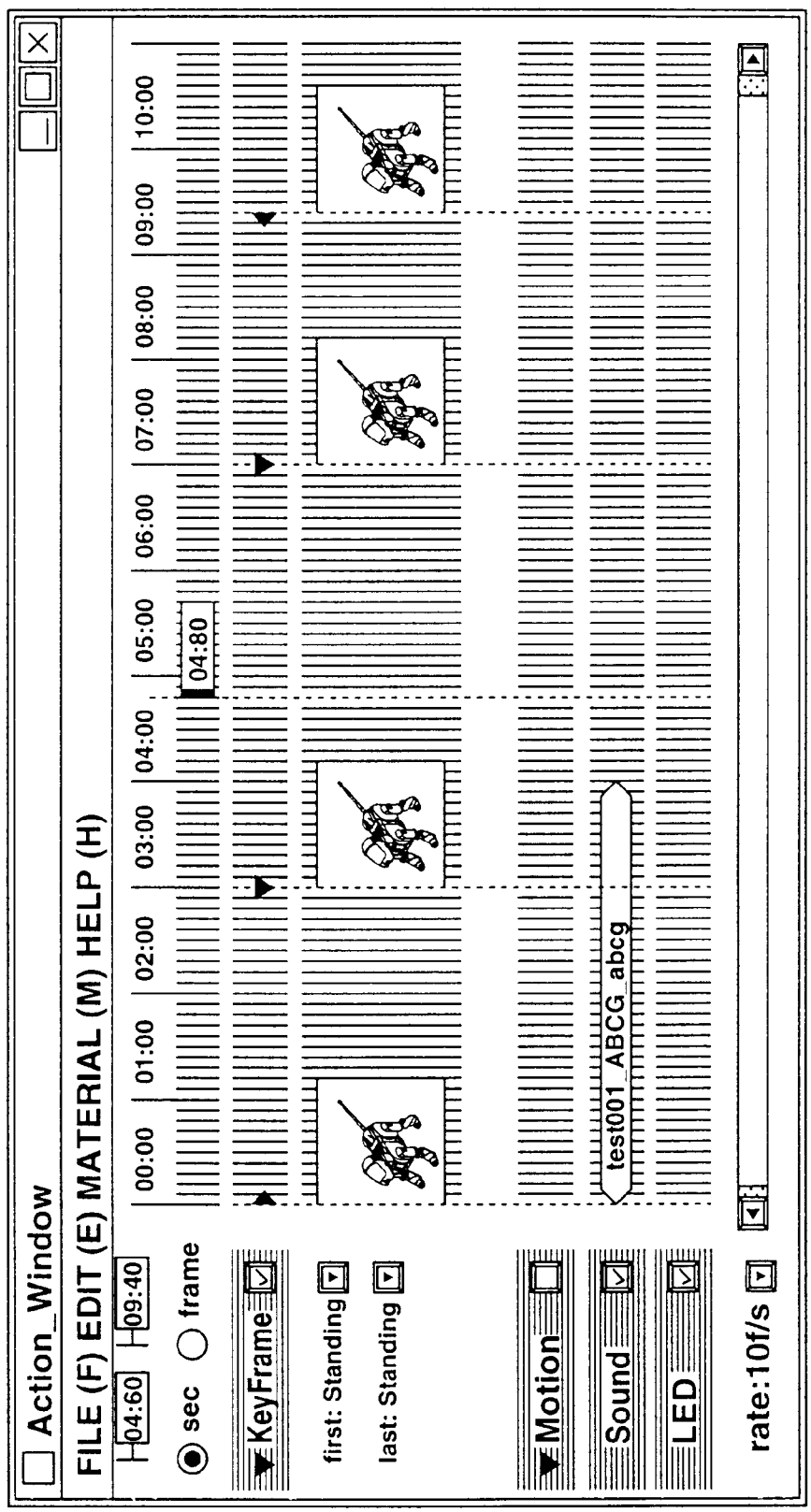
FIG. 13 shows the action editing window with a key frame channel open (key frame detail channel).

In the present embodiment, the keyframe channel 202 can be opened or closed as desired. FIG. 13 shows the action editing window 200 as the keyframe channel 202 is opened (keyframe detail channel). On each relevant site of the time axis in the keyframe channel 202, there is placed a thumbnail representing a key frame. What is termed the 'keyframe' here means a picture frame delineating the pose at the relevant time of the mobile robot effectuating the motion.

The initial pose and the final pose means special keyframes at the beginning and trailing ends of a keyframe channel. The first and last keyframes are put from the outset.

During the time interval on the keyframe channel, devoid of a keyframe, a frame interpolated by the keyframes on both sides of this time interval, referred to below as interpolated frame, is reproduced. The interpolated frame is not displayed on the keyframe. With the authoring system of the instant embodiment, if the respective keyframes are arrayed on the keyframe channel, the motion smoothly interconnecting the poses stated in the respective keyframes, is automatically generated by computer processing. The center of gravity of the 3D model can also be set with each keyframe to approximate the apparent movements of the 3D model to that of a real machine.

Each keyframe is arranged on the keyframe channel so that the left end of the thumbnail will be the time point of the keyframe. Moreover, the thumbnail can be dragged in the left and right direction along the time axis, the keyframe line then performing the followup movement to change the time of the corresponding keyframe. It is noted that the extension and contraction of the keyframe of the last pose is the extension and contraction of the overall action time.

When the thumbnail is double-clicked, the pose editing window of the relevant pose is opened to enable the pose editing. It should be noted that the initial and trailing poses are not editable such that double-clicking these poses cannot open the pose editing window. The pose editing window will be explained in detail subsequently.

The motion channel 203 is an area for editing and displaying the motion contents along the time axis prescribed by the time ruler 201.

Figure 14:
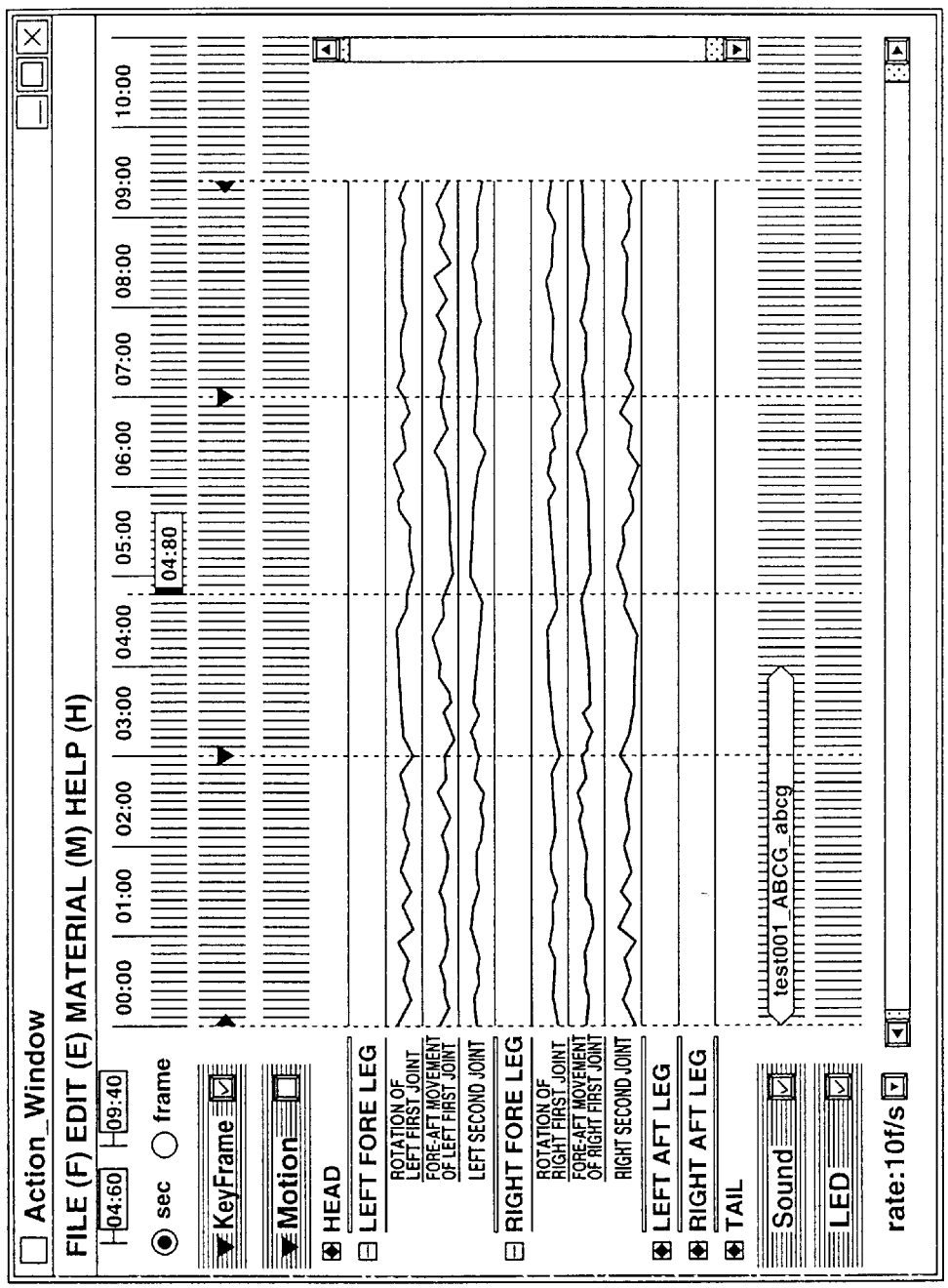
FIG. 14 shows the action editing window with a motion channel open (motion detail channel).

In the instant embodiment, the motion channel 203 may be opened and closed. FIG. 14 shows the action editing window 200, with the motion channel 203 opened (motion detail channel). The motion is defined by the movements of the respective joint actuators forming the mobile robot 1. In the motion channel 203, the timing charts stating the chronological movements of the respective joint actuators are listed up in a tree style in accordance with the living body simulating model (tree view).

The segmented line graphs of the respective timing charts represent time changes of movements, that is rotational angles, of the relevant joint actuators.

The setting values at the relevant time of the relevant joint actuators can be changed by vertically dragging the points of intersection of the keyframe line 210 and the segmented line.

Moreover, the dragging changes the poses corresponding to the keyframe line 210 to enable the automatic updating of the keyframe contents.

On the motion detail channel, the movement of each joint actuator can be visually grasped in the timing chart style. The segmented line can be directly acted on by drag-and-drop. A segmented line concerning a given joint actuator can be copied to another joint actuator. The result is that the segmented line for a given joint actuator may be copied to another joint actuator. Consequently, the motion file editing operation can be performed intuitively, while the labor in the editing operation can be saved appreciably. Moreover, by the copying operation, regular movements, such as movements symmetrical in the left and right direction, may be edited extremely readily. There are also occasions wherein motion data of a given motion differs depending on the difference of the model of the mobile robot 1, that is the difference in the information in the hardware structure ascribable to different combinations of the CPC components. In such case, the data can be re-used as data for different models by applying data transformation on the basis of the model-based fixed data.

The motion detail channel and its tree view are scrolled horizontally and vertically in keeping with the operation of the scroll bar for the horizontal direction and that for the vertical direction.

The sound channel is an area for displaying sound data along the time axis prescribed by the time ruler 201. In the present embodiment, the 'sound detail window' independent from the action editing window 200 may be opened to edit the sound data of the MIDI style on the window by GUI operation. The sound detail window will be explained in detail subsequently.

The sound channel 204 is provided with a sound ON/OFF check box 213. By marking the check box, the sound may be issued in reproduction.

The LED operation channel 205 is an area in which to display LED operating data along the tine axis prescribed by the time ruler 201. In the present embodiment, an 'LED detail window 500' independent from the action editing window 200 may be opened to edit the LED operating data of the MIDI style on the window by GUI operation. The LED detail window 500 will be explained later in detail.

The LED operating channel 205 is provided with an LED ON/OFF check box 214. By marking the check box, the LED operation may be energized in reproduction.

The action editing window 200 is able to accept the drag-and-drop operation from the project window (see FIG. 6). That is, the respective files, as constituent elements of an action, such as motion file, sound file or the LED file, can be directly dragged and dropped from the project window for registration in the action window extremely readily.

The action editing window 200 is also able to accept the drag-and-drop operation from the MS Windows explorer. That is, the respective files, as constituent elements of an action, such as motion file, sound file or the LED file, can be directly dragged and dropped from the explorer window for registration in the action window extremely readily. The files registered in the action window are simultaneously registered in the project window.

Figure 15:
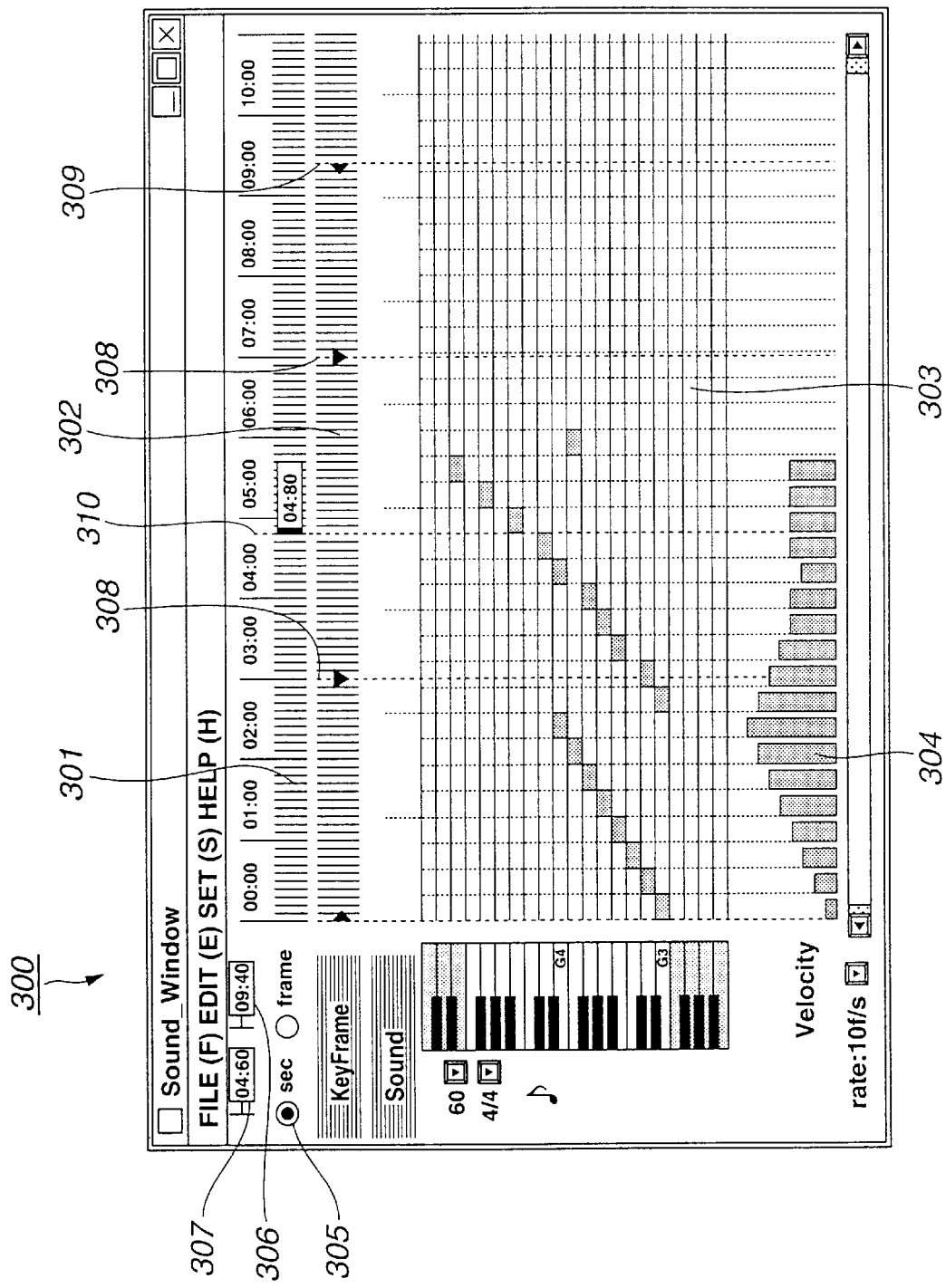
FIG. 15 shows a sound detail window for editing the sound file of the MIDI form.

FIG. 15 schematically shows the structure of a sound detail window 300 used for editing the sound file of the MIDI style. As shown, the sound detail window 300 is made up by a title bar, a menu bar and an editing area in which to execute the editing of the sound file of the MIDI style by GUI operations.

In the menu bar, there are provided respective menus 'file', 'edit', 'set' and 'help'.

Figure 16:
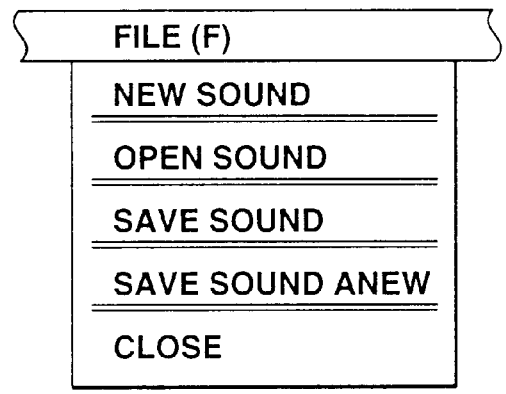
FIG. 16 shows a sum-menu item of the menu 'file' in the sound detail window for MIDI form.

If the menu 'file' is selected, there appears a pull-down menu comprised of sub-menus 'new sound', 'open sound', 'save sound', 'save new sound' and 'close' (see FIG. 16).

If the sub-menu 'new sound' is selected, a novel MIDI sound is produced. If already an unsaved MIDI sound is opened, there appears a dialog prompting the user to confirm whether or not the MIDI sound is to be saved.

If the sub-menu 'open sound' is selected, a pre-existing MINI sound file is opened. If an unsaved MIDI sound has already been opened, there appears a dialog prompting the user to confirm whether or not the action is to be saved (see the same figure).

If the sub-menu 'save sound' is selected, the relevant action file is overwrite-saved. In case of an unsaved file, a file setting dialog appears, as in the case of new action saving, as later explained, to prompt the user to input the filename.

If the sub-menu 'save new sound' is selected, a file setting dialog appears to prompt the user to input a filename.

If the menu (close) is selected, the sound detail window 300 is closed. If the sound file in the window is not as yet saved, there appears a dialog prompting the user to confirm whether or not the unsaved file is to be saved.

Figure 17:
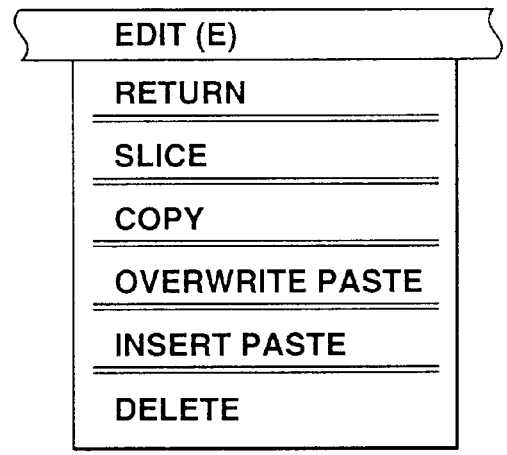
FIG. 17 shows a sum-menu item of the menu 'edit' in the sound detail window for MIDI form.

If the menu 'edit' is selected, there appears a pulldown menu comprised of respective sub-menus of 'revert', 'slice', 'copy', 'overwrite paste', 'insert paste' and 'delete' (see FIG. 17).

If the sub-menu 'revert' is selected, undo processing is carried out beginning from a near-by operation.

If the sub-menu 'slice' is selected, the sound over a selected time span, if any, is cut. Actually, the so cut data is transiently stored in a clipboard. By this cutting, not the frame itself but the information concerning the contents of the frame is lost.

If the sub-menu 'copy' is selected, the sound over a selected time span, if any, is cut. Actually, the so cut data is transiently stored in a clipboard.

If the sub-menu 'overwrite paste' is selected, the contents stored in the clipboard are pasted at the current time point.

If the sub-menu 'insert paste' is selected, the contents stored in the clipboard are inserted and pasted at the current time point.

If the sub-menu 'delete' is selected, the motion over a selected time span, if any, is deleted. It is not the frame itself but the information on the contents of the frame that is lost.

Figure 18:
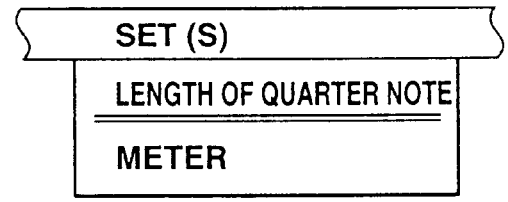
FIG. 18 shows a sum-menu item of the menu 'set' in the sound detail window for MIDI form.

If the menu 'setting' is selected, there further appears a pulldown menu comprised of sub-menus 'length of quarter notes' and 'meter' (see FIG. 18).

The sub-menu 'length of a quarter note' further has a sub-menu, not shown, and can be subdivided only for one fourths of the note. The length so set is displayed as a grid on the score along the time axis direction.

The sub-menu 'meter' further has a sub-menu specifying the rhythm. Based on the value, here set, there is delineated a line determining the meter on the time axis grid on the score.

In the menu 'help', there are contained the sub-menus, such as topic, support web or the version information.

Reverting to FIG. 15, the editing area of the sound detail window 300 for the MIDI sound is explained. The editing area is a two-dimensional time-line table, formed by the time axis in the transverse direction and by the channel in the vertical direction. The time line table is made up by a time ruler 301, a keyframe channel 302, a score channel 303 and a velocity channel 304.

The time ruler 301 exploits a unit switching radio button 305 to switch between real time display and the display with the number of frames. In the instance shown in FIG. 15, real-time display is selected. The real-time display is in second: millisecond, each being of two digits. As for the relationship between the real time in the real-time display and the display with the time ruler 301, reference is had to the equation 1 above. The time ruler 301 with display with the number of frames is graduated so that the number of frames is represented by four digits. The maximum number 9999 of frames is equivalent to approximately 160 seconds.

As for the frame width setting on the picture in each case of the real time display in seconds and the display with the number of frames f, reference is had to Tables 1 and 2 above.

The time ruler 301 includes an end time display field 306 and a current time display field 307, in addition to the unit switching radio button 305. In the end time display field 306, a time representing numerical figure indicating the end time of the action being edited, that is the operating time, is displayed. In the illustrated instance, "09:40" (=9 seconds 40) is displayed. In the current time display field 307, a time representing numerical figure for the current position is displayed. In the illustrated instance, "04:60" (=4 seconds 60) is displayed. These fields are editable text fields. When a numerical figure for any meaningful time point is input, it becomes the end time such that the last keyframe is moved or the current time is moved to such position.

On the time ruler 301, a 'time width changing popup menu', not shown, for changing the interval of the time ruler 301, may be invoked.

In the editing area, a 'keyframe line 308', an 'end time line 309' and a 'current time line' 310 are displayed as time display lines. The keyframe line 308, representing the time of each keyframe, as later explained, is demonstrated as intersecting the respective channels. The user is able to perform the operation of editing the MIDI sound as the or she visually checks for synchronization with the keyframe. Moreover, since the end time line 309 indicating the end time of the action being edited is displayed as intersecting the respective channels, the user is able to visually comprehend the time range for editing. Moreover, the current time line 310, indicating the current time, is displayed as intersecting the respective channels. Basically, when any optional channel is clicked, the current time shifts to such position.

In the keyframe channel 302, keyframe positions, as acquired from the action editing window 200 along time axis as specified by the time ruler 301, are displayed. However, in distinction from the case of the action editing window 200 (see FIG. 13), the keyframe channel cannot be opened nor closed within the sound detail window 300.

The score channel is an area for editing the MIDI sound by GUI operation, and is made up by a piano keyboard and a basic grid along the time axis direction. It should be noted that the effective sound range differs depending on the model of the mobile robot 1.

On the piano keyboard, the maximum sound range allowed by the hardware specifications of the mobile robot 1 is demonstrated by image display of the piano keyboard. Alternatively, the reproducible sound range may be displayed brightly, with the remaining areas being displayed in gray. In the basic C key portion, the pitch of the absolute sound, such as C3 or C4, is displayed.

In the score part, the grid of time width of the quarter note as set is displayed. By the value as set by the meter, described above, the lines of the two grids, that is two beats, three grids, that is three beats, or four grids, that is four beats, are emphasized.

On the score channel, a score is formed by the sound duration as the basis of the time axis and by the pitch of piano keys. One mesh is termed a cell. The cell with the sound is colored. However, in a replay model for only one sound, no sound can be put in the different scales on the same time axis.

If a void, that is uncolored, cell is clicked, the sound of a duration of the sound note mark as selected is put. If the sound is present at another pitch position at the same time, the sound is replaced by the clicked pitch. If the cell where the sound is already present is clicked, the sound is removed.

On the left side of the keyboard are displayed marks of notes, such as a sixteenth note, eighth note, quarter note, a half note, a whole note, dotted eighth note, dotted quarter note and a dotted half note. These sound note marks have reciprocally exclusive selection states such that only one of them is necessarily selected. The selected item is varied on mouse click operations.

The velocity channel 304 is an area for demonstrating the intensity of the velocity from one sound to another. Although the instance of FIG. 15 shows the sound intensity in a bar graph, it may also be shown by a segmented line graph. The sound intensity at each nodal point can be adjusted by dragging the upper end of each bar in the bar graph. The maximum sound volume is set as default.

A 'replay button' for commanding the replay of the edited sound may also be provided in the sound detail channel.

Figure 19:
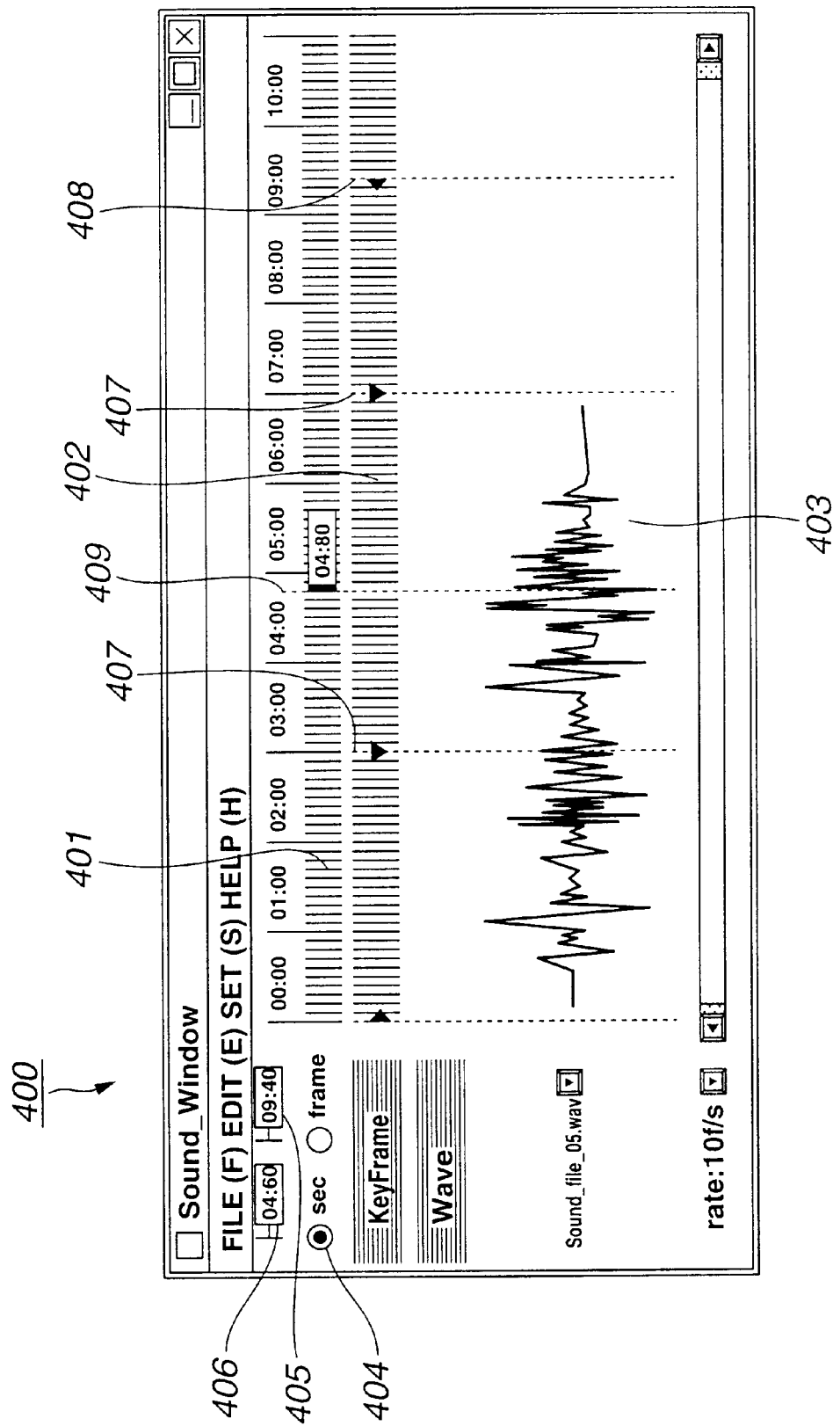
FIG. 19 schematically shows the structure of the sound detail window for demonstrating a sound file of the WAVE form.

FIG. 19 schematically shows the structure of a sound detail window 400 for displaying the sound file of the WAVE form. As shown, the sound detail window 400 is made up of a title bar, a menu bar and an editing area for editing the sound file of the WAVE form.

In the menu bar, there are provided menus 'file', 'edit' and 'help'.

Figure 20:
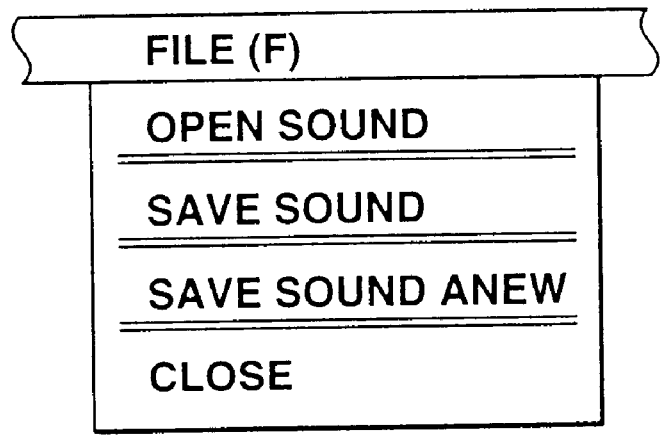
FIG. 20 shows a submenu item of the menu 'file' in the sound detail window for WAVE form.

If the menu 'file' is selected, there appears further a pull-down menu comprised of sub-menus 'open sound', 'save sound', 'save new sound' and 'close' (see FIG. 20).

If the sub-menu 'open sound' is selected, the pre-existing WAVE sound file is opened. If an unsaved sound has already been opened, there appears a dialog prompting the user to confirm whether or not the WAVE sound is to be saved.

If the sub-menu 'save sound' is selected, the relevant WAVE sound file is overwrite-saved. If the sub-menu 'save new sound' is selected, a file setting dialog appears to prompt the user to input a filename.

If the sub-menu 'close' is selected, this sound editing window 400 is closed. If a sound file(s) in the window is as yet not saved, a dialog appears to prompt the user to confirm whether or not this file is to be saved.

Figure 21:
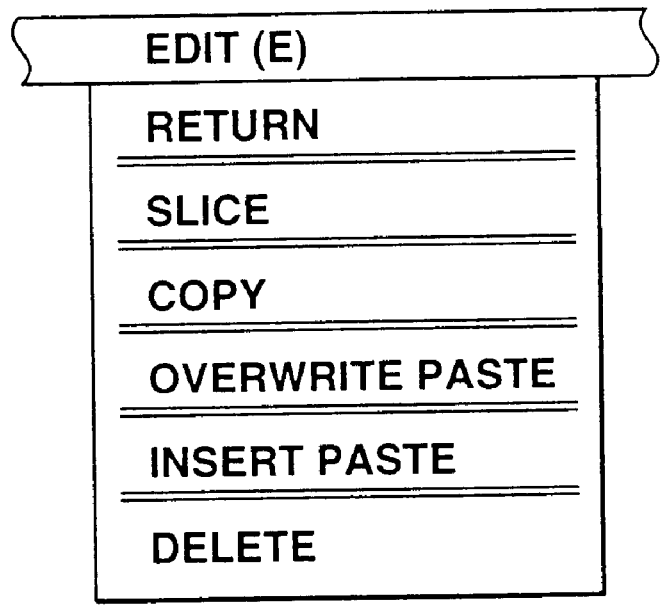
FIG. 21 shows a submenu item of the menu 'edit' in the sound detail window for WAVE form.

If the menu (edit) is selected, there appears a pull-down menu comprised of sub-menus 'return', 'slice', 'copy', 'overwrite paste', 'insert paste' and 'delete' (see FIG. 21).

If the sub-menu 'revert' is selected, undo processing is carried out beginning from the near-by operation.

If the sub-menu 'slice' is selected, the sound over a selected time span, if any, is cut. Actually, the so cut data is transiently stored in a clipboard. By this cutting, not the frame itself but the information concerning the contents of the frame is lost.

If the sub-menu 'copy' is selected, the motion over a selected time span, if any, is copied. Actually, the so copied data is transiently stored in a clipboard.

If the sub-menu 'overwrite paste' is selected, the contents stored in the clipboard are pasted at the current time point.

If the sub-menu 'insert paste' is selected, the contents stored in the clipboard are inserted and pasted at the current time point.

If the sub-menu 'delete' is selected, the motion over a selected time span, if any, is deleted. The frame itself is not lost, but is in a silent state.

In the menu 'help', there are included sub-menus, such as topic, support web or the version information.

The editing area of the sound detail window 400 for WAVE sound is two-dimensional time-line table, formed by the time axis in the transverse direction and by the channel in the vertical direction. The time line table is made up by a time ruler 401, a keyframe channel 402 and a WAVE channel 403.

The time ruler 401 exploits a unit switching radio button 404 to switch between real time display and the display with the number of frames. In the instance shown in FIG. 15, real-time display is selected. The real-time display is in second: millisecond, each being of two digits. As for the relationship between the real time in the real-time display and the display with the number of frames, reference is had to the equation 1 above. The time ruler 401 with display with the number of frames is graduated so that the number of frames is represented by four digits. The maximum number 9999 of frames is equivalent to approximately 160 seconds.

As for the frame width setting on the picture in each case of the real time display in seconds and the display with the number of frames f, reference is had to Tables 1 and 2 above.

The time ruler 401 includes an end time display field 405 and the current time display field 406, in addition to the unit switching radio button 404.

In the end time display field 405, a time representing numerical figure indicating the end time of the action being edited, that is the operating time, is displayed. In the illustrated instance, "09:40" (=9 seconds 40) is displayed. In the current time display field 306, a time representing numerical figure for the current position is displayed. In the illustrated instance, "04:60" (=4 seconds 60) is displayed. These fields are editable text fields. When a numerical figure for any meaningful time point is input, it becomes the end time such that the last keyframe is moved or the current time is moved to such position.

On the time ruler 401, a 'time width changing popup menu', not shown, for changing the interval of the time ruler 401, may be invoked.

In the editing area, a 'keyframe line 407', an 'end time line 408' and a 'current time line 409' are displayed as time display line.

The keyframe line 407, representing the time of each keyframe, as later explained, is demonstrated as intersecting the respective channels. The user is able to perform the operation of editing the MIDI sound as the or she visually checks for synchronization with the keyframe. Moreover, since the end time line 408 indicating the end time of the action being edited is displayed as intersecting the respective channels, the user is able to visually comprehend the time range for editing. Moreover, the current time line 409, indicating the current time, is displayed as intersecting the respective channels. Basically, when any optional channel is clicked, the current time shifts to such position.

In the keyframe channel 402, keyframe positions, as acquired from the action editing window 200 along time axis as specified by the time ruler 401, are displayed. However, in distinction from the case of the action editing window 200 (see FIG. 13), the keyframe channel cannot be opened nor closed within the sound detail window 400.

In the WAVE channel 403, the contents of the sound file of the WAVE form are represented as the waveform, as shown in FIG. 19. However, in distinction from the case of the score channel for MIDI style, described above, only the basic slicing operation is allowed on the WAVE channel 403.

Additionally, a 'replay button' for commanding the replay of the edited sound may also be provided in the sound detail channel.

Figure 22:
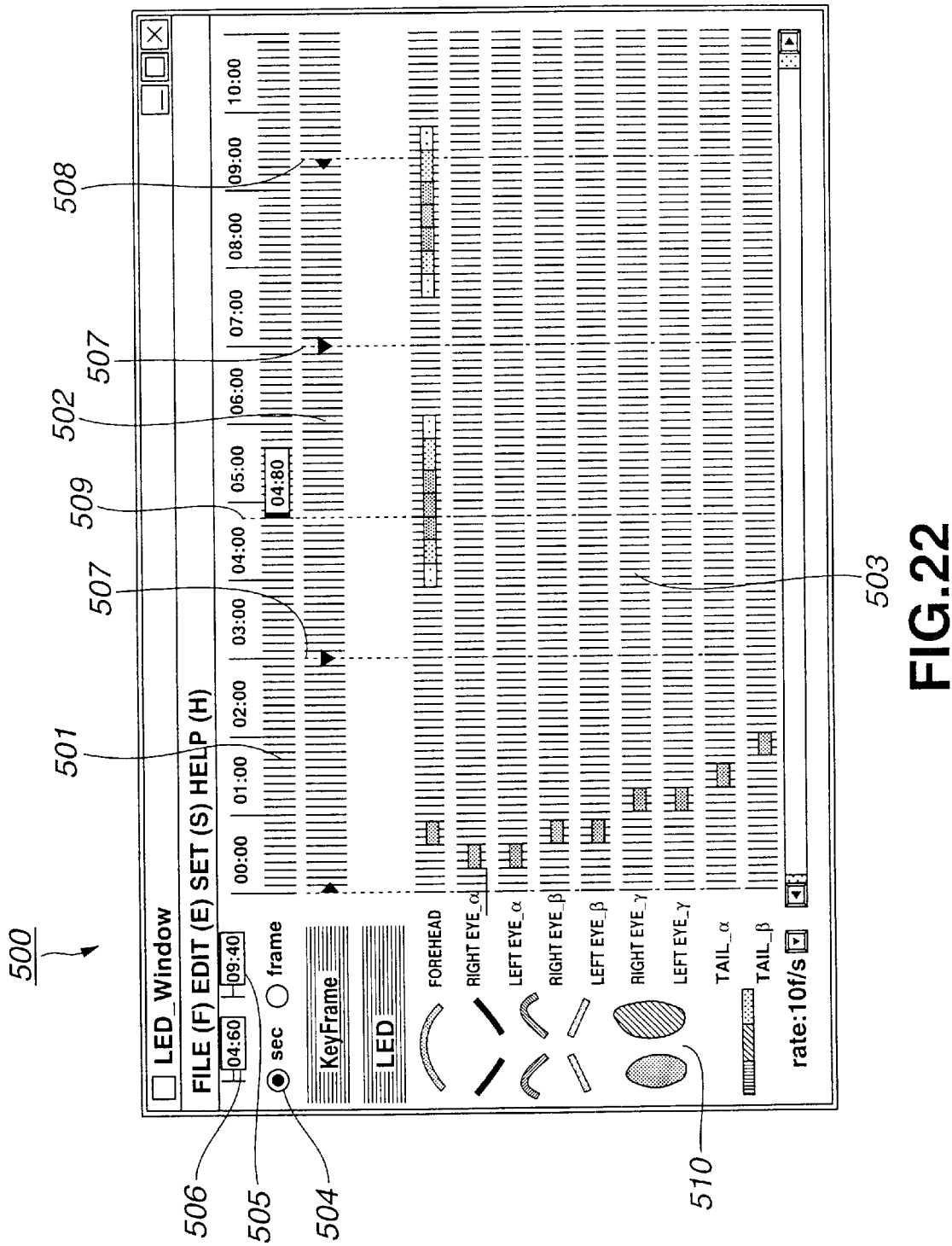
FIG. 22 schematically shows the structure of an LED detail window for demonstrating an LED operation file.

FIG. 22 schematically shows the structure of a sound detail window 500 used for displaying and editing the LED operation file stated in the MIDI style. As shown, the sound detail window 500 is made up by a title bar, a menu bar and an editing area in which to execute the editing of the LED operation file of the WAVE style.

In the menu bar, there are provided respective menus 'file', 'edit', 'set' and 'help'.

Figure 23:
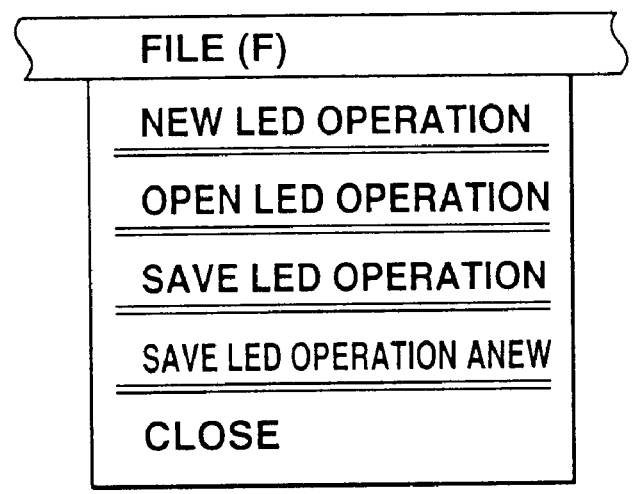
FIG. 23 shows a submenu item of the menu 'file' in the LED operation file.
Figure 24:
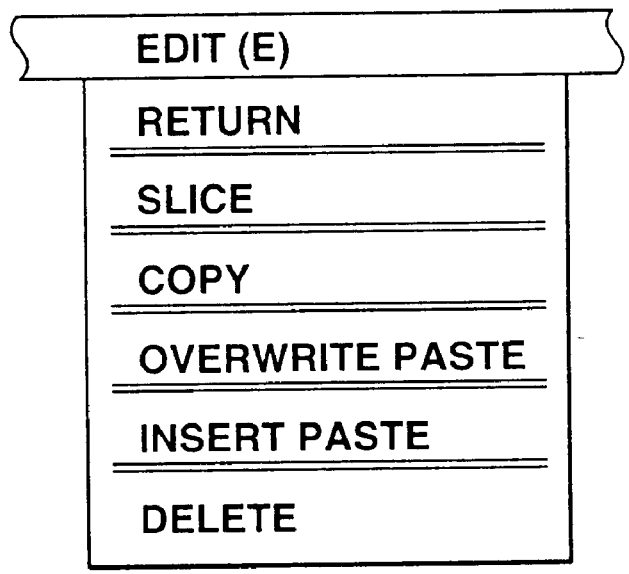
FIG. 24 shows a submenu item of menu 'file' in the LED operation file.

If the menu 'file' is selected, there appears a pull-down menu comprised of sub-menus 'new LED operation', 'open LED operation', 'save LED operation', 'save new LED operation' and 'close' (see FIG. 23).

If the sub-menu 'new LED operation' is selected, a novel LED operation is produced. If already an unsaved MIDI sound is opened, there appears a dialog which prompts the user to confirm whether or not the LED operation is to be saved.

If the sub-menu 'open LED operation' is selected, a pre-existing LED operation file is opened. If an unsaved MIDI sound has already been opened, there appears a dialog prompting the user to confirm whether or not its MIDI sound is to be saved (as above).

If the sub-menu 'save LED operation' is selected, the relevant LED operation file is overwrite-saved. In case of an unsaved file, a file setting dialog appears, as in the case of saving a new LED operation, as later explained, to prompt the user to input the filename.

If the sub-menu 'save new LED operation' is selected, a file setting dialog appears to prompt the user to input a filename.

If the menu 'close' is selected, the LED operation detail window is closed. If the LED operation file in the window is not as yet saved, there appears a dialog to prompt the user to confirm whether or not the unsaved file is to be saved.

If the menu 'edit' is selected, there appears a pulldown menu comprised of respective sub-menus of 'revert', 'slice', 'copy', 'overwrite paste', 'insert paste' and 'delete' (see FIG. 17).

If the sub-menu 'revert' is selected, undo processing is carried out beginning from the near-by operation.

If the sub-menu 'slice' is selected, the LED operation over a selected time span, if any, is cut. Actually, the so cut data is transiently stored in a clipboard. By this cutting, not the frame itself but the information concerning the contents of the frame is lost.

If the sub-menu 'copy' is selected, the LED operation over a selected time span, if any, is cut. Actually, the so copied data is transiently stored in a clipboard.

If the sub-menu 'overwrite paste' is selected, the contents stored in the clipboard are pasted at the current time point.

If the sub-menu 'insert paste' is selected, the contents stored in the clipboard are inserted and pasted at the current time point.

If the sub-menu 'delete' is selected, the LED operation over a selected time span, if any, is deleted. It is not the frame itself but the information on the contents of the frame that is lost.

In the menu 'help', there are included sub-menus, such as topic, support web or the version information.

Reverting to FIG. 22, the editing area of the LED detail window 500 is explained. The editing area of the LED detail window for WAVE sound is a two-dimensional time-line table, formed by the time axis in the transverse direction and by the channel in the vertical direction. The time line table is made up by a time ruler 501, a keyframe channel 502 and a WAVE channel 503.

The time ruler 501 exploits a unit switching radio button 504 to switch between real time display and the display with the number of frames. In the instance shown in FIG. 22, real-time display is selected. The real-time display is in second: millisecond, each being of two digits. As for the relationship between the real time in the real-time display and the display with the number of frames, reference is had to the equation 1 above. The time ruler 501 with display with the number of frames is graduated so that the number of frames is represented by four digits. The maximum number 9999 of frames is equivalent to approximately 160 seconds.

As for the frame width setting on the picture in each case of the real time display in seconds and the display with the number of frames f, reference is had to Tables 1 and 2 above.

The time ruler 501 includes an end time display field 505 and a current time display field 506, in addition to the unit switching radio button 504. In the end time display field 505, a time representing numerical figure indicating the end time of the action being edited, that is the operating time, is displayed. In the illustrated instance, "09:40" (=9 seconds 40) is displayed. In the current time display field 506, a time representing numerical figure for the current position is displayed. In the illustrated instance, "04:60" (=4 seconds 60) is displayed. These fields are editable text fields. When a numerical figure for any meaningful time point is input, it becomes the end time such that the last keyframe is moved or the current time is moved to such position.

On the time ruler 501, a 'time width changing popup menu', not shown, for changing the interval of the time ruler 501, may be invoked.

In the editing area, a 'keyframe line 507', an 'end time line 508' and a 'current time line 509' are displayed as time display lines. The keyframe line 507, representing the time of each keyframe, as later explained, is demonstrated as intersecting the respective channels. The user is able to perform the operation of editing the LED operation as he or she visually checks for synchronization with the keyframe. Moreover, since the end time line 508 indicating the end time of the action being editing is displayed as intersecting the respective channels, the user is able to visually comprehend the time range for editing. Moreover, the current time line 509, indicating the current time, is displayed as intersecting the respective channels. Basically, when any optional channel is clicked, the current time shifts to such position.

In the keyframe channel 502, keyframe positions, as acquired from the action editing window 200 along time axis as specified by the time ruler 501, are displayed. However, in distinction from the case of the action editing window 200 (see FIG. 13), the keyframe channel cannot be opened nor closed within the sound detail window 500.

The score channel is an area for editing the LED operation, stated in the MIDI style, by GUI operations, and is constituted by a list of mounting sites of LEDs on the main body unit of the mobile robot 1, and by a basic grid in the time axis direction. In the present embodiment, LEDs are arranged on the forehead, a right eye α, a left eye α, aright eye β, a left eye β, a right eye γ, a left eye γ, a tail α and a tail β.

On the score channel, there are formed scores of respective site list by displaying the illuminated state of the LEDs of the respective sites on the time axis. One mesh is termed a 'cell'. The cells of the positions of lighting of the LEDs on the time axis are colored depending on the color and the lighting intensity. In distinction from the score channel for editing the MIDI sound, as described above with reference to FIG. 15, the LEDs of the respective sites can be turned on/off independently of one another.

On the left lateral side of the score channel, there is displayed an LED site visual 510 which graphically represents the respective sites of the LEDs that can be modified.

Below the LED site visual 510, there are arrayed velocity marks indicating rise, an uppermost position maintained, and descent. These marks own reciprocally exclusive selection states such that one of them is selected at all times. The selection item is changed by mouse click.

The authoring system of the present embodiment includes a preview window 600 for visually confirming the contents of the action edited on the action editing window 200.

Figure 25:
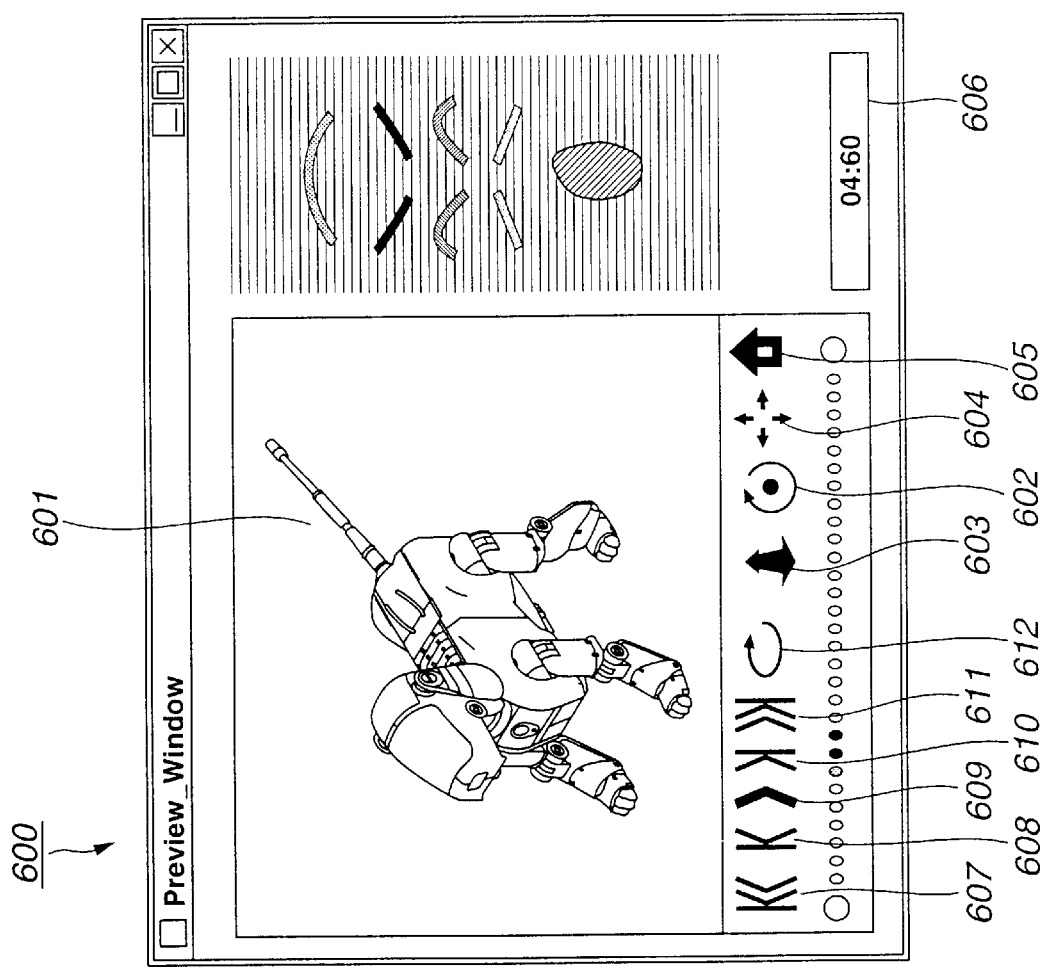
FIG. 25 schematically shows the structure of a preview window for monitoring an action edited in the action editing window.

FIG. 25 schematically shows the structure of the preview window 600. As shown therein, the preview window 600 is made up of a '3D view 601', a 'set of 3D display switching buttons', a 'current time field' 606 and a 'set of replay buttons'.

On the 3D preview 601 is perpetually displayed an image of the three-dimensional mobile robot 1 generated by computer graphics processing. The line of sight direction can be moved to change the 'look' of the view by dragging on this view. Although not shown, the 3C model can also be designed to be pre-viewed simultaneously from two or more viewing points. The view movement is operatively linked to the user's inputting operations on the set of 3D display switching buttons. There is also provided the function of checking for collision of respective sites or the driving speeds of the respective joints by this 3D model, as an aid in creating and processing the 3D display of the motion. The center of gravity of the 3D model can be set on each key frame to approximate the apparent movement of the 3D model to closer to the movement of an actual machine.

On the right side of the 3D preview 601 is arranged an LED operation preview area for demonstrating the LED operations. In this preview area, the manner of the turning on/off of the LEDs of the mobile robot 1 is displayed in synchronism with the movements of the mobile robot 1 on the 3D preview 601.

The set of the set of 3D display switching buttons includes a 'rotational button 602', 'zoom-in zoom-out button 603', a 'pan button' 604 and a 'home position button 605'. The user may click these buttons to change the line of sight direction within the 3D preview 601.

For example, if the rotational button is clicked, the rotating mode is set. If then the 3D preview 601 is dragged, the 3D mobile robot 1 in the 3D preview 601 is rotated.

If then the 'zoom-in zoom-out button 603' is clicked, the 3D preview 601 is in the zoom mode. If then the 3D preview 601 is dragged in the vertical direction, the 3D mobile robot 1 in the 3D preview 601 is zoomed in/out.

If then the 'pan button 604' is clicked, the 3D preview 601 is in the pan mode. If the 3D view 601 then is dragged in the vertical direction and in the left and right direction, the mobile robot 1 in the 3D preview 601 is panned, that is moved at a high speed.

If the home position button 605 is clicked, the three-dimensional display of the mobile robot 1 reverts to a state of view of default, that is to a state of the robot as seen from the line of sight direction.

In the current time field 606, the current time of the contents as displayed on the 3D preview 601 is displayed. In the instance shown, the current time "04:60" is displayed. If any numerical figure meaningful as time is input to ths field, the display on the 3D preview 601 is changed to a frame of the relevant time. The current time position is also relatively visually displayed.

The set of replay buttons include a 'frame rewind button 607', a 'previous key frame button 608', a 'play/stop button 609', a 'stepwise frame feed button 610', a 'frame feed button 611' and a 'loop replay button 612'.

If the 'frame rewind button 607' is clicked, the display of the 3D preview 601 reverts to the first frame. If the 'previous key frame button 608' is clicked, the replay of the display on the 3D preview 601 skips from the current position to the directly previous keyframe. If the 'play/stop button 609' is clicked, the replay of the display of the 3D preview 601 is started or stopped (the play/stop button 609 is halted or in operation during play or stop, respectively). The 'stepwise frame feed button 610' is valid only during reproduction of the display of the 3D preview 601 and, if the button is clicked, the display is intermittently fed on the frame basis. When the 'frame feed button 611' is clicked, the display of the 3D preview 601 skips to the last frame. When the 'loop replay button 612' is clicked, the 3D preview 601 is displayed in a loop fashion.

The authoring system of the instant embodiment includes a pose window 700 for editing a three-dimensional pose of the mobile robot 1 by GUI operations consisting essentially in dragging.

The pose edited on the pose window 700 can be used e.g., as a keyframe making up the motion. For example, the pose window 700 can be booted by double-clicking the desired keyframe on the keyframe channel.

Figure 26:
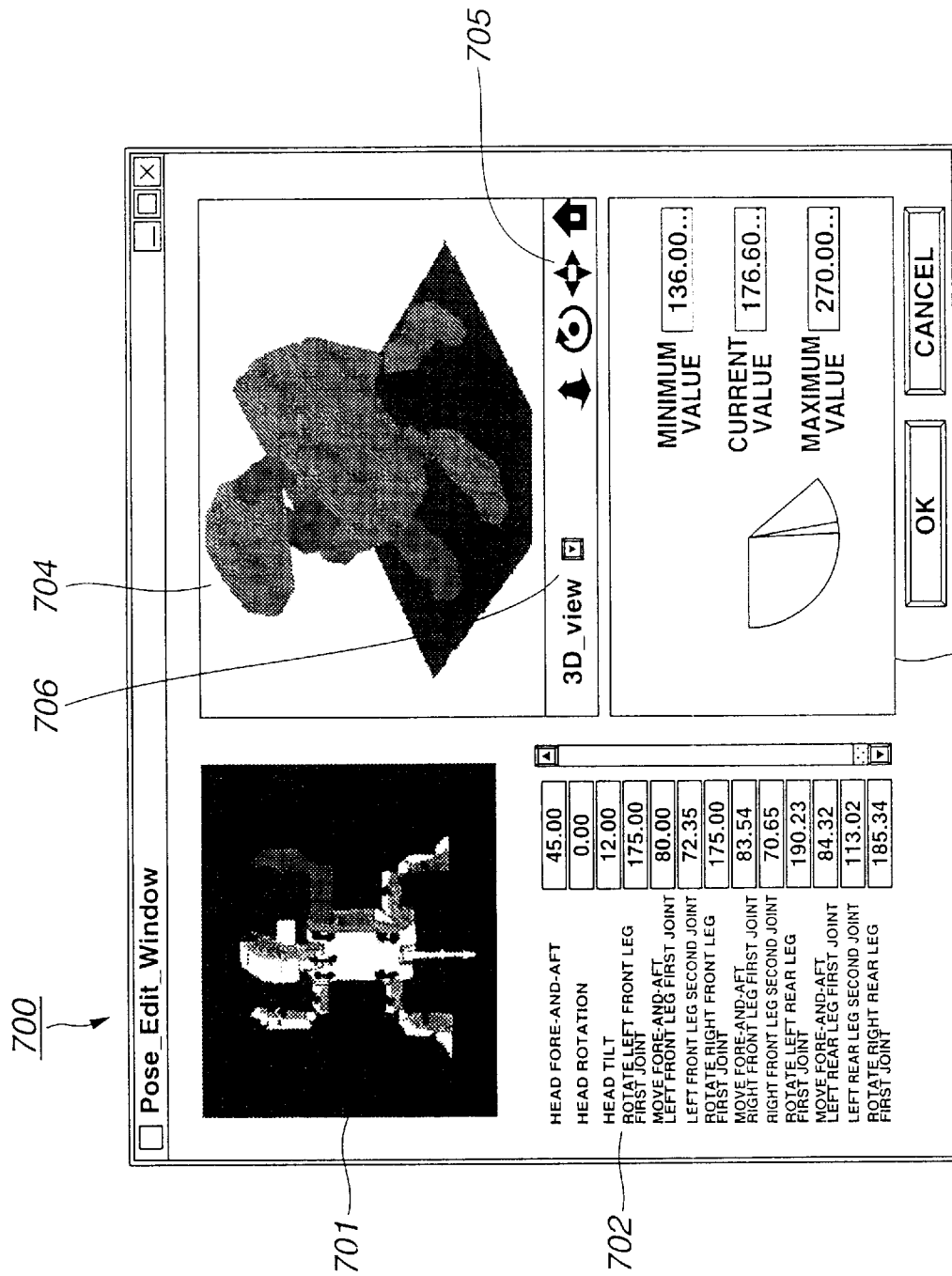
FIG. 26 schematically shows the structure of a pose window for editing a 3D pose of a mobile robot by a GUI operation.

FIG. 26 schematically shows the structure of the pose window 700. On this pose window 700, the rotational angles of the respective joint actuators forming the mobile robot 1 can be directly commanded by GUI operations to specify the desired pose extremely readily. The pose window 700 is made up of an entity specifying area 701, a list specifying area 702, a setting value area 703, a 3D display area 704, a set of 3D display switching buttons 705 and a display switching popup 706.

In the entity specifying area 701, a developed plan view of the mobile robot 1 is displayed to permit the user to select the editable sites. The so selected sites correspond to the items of list commands and are displayed with emphasis or 'blinked' on the 3D display to switch the contents of the setting value areas.

In the list specifying area 702, the editable sites of the mobile robot 1 and the setting values thereof are displayed as a list. If the user selects a specified site from this list, the relevant site in the entity specifying area 701 is displayed with emphasis. In the 3D display area 704, emphasized display or blinking occurs to switch the contents of the setting value area 703.

In the setting value area 703, the names of the setting sites, setting values, minimum settable values and maximum settable values of the editable sites are displayed in a list. If the user selects a specified site, its contents are switched. The setting values can be directly set on key input in an inputtable field. The angular expression is by an arc, with the setting value being varied on dragging a line for selection.

In the 3D display area 704, the full-body image of the mobile robot 1 generated by 3D graphics is delineated along with the terrestrial ground. If the user clicks to select the relevant site from the 3D display, the site can be selected with emphasis. The setting value can be directly switched on dragging the selected site.

The contents displayed in the 3D display area 704 are operatively linked with the 3D display switching button, such that, on dragging on the view of the 3D display area 704, the 'look' of the view, that is the line of sight direction, can be changed.

The set of 3D display switching buttons includes a 'rotational button', a 'zoom-in zoom-out button', a 'pan button' and a 'home position button'. The user may click these buttons to change the line of sight direction within the 3D display area 704.

For example, if the rotational button is clicked, the rotating mode is set. If then the 3D display area 704 is dragged, the mobile robot 1 in the 3D display area 704 is rotated. If then the zoom-in zoom-out button is clicked, the mode is the zoom mode. If then the 3D display area 704 is dragged in the vertical direction, the mobile robot 1 is zoomed in and out in the 3D display area 704. If then the pan button is clicked, the mode is the pan mode. If the mobile robot 1 then is dragged in the vertical direction and in the left and right direction in the 3D display area 704, the mobile robot 1 in the 3D display area 704 is panned, that is moved at a high speed. If the home position button is clicked, the three-dimensional display of the mobile robot 1 reverts to a state of view of default, that is to a state of the robot as seen from the line of sight direction.

On button clicking on the display switching popup 706, the a popup menu, not shown, comprised of a front side/back side/right lateral side/left lateral side/upper side/bottom side/3D is displayed for switching to a view from the direction as selected by menu selection.

On the pose window 700, there are provided an OK button and a cancel button. If the OK button is clicked, all editing items in the window are validated to close the window and, if conversely the cancel button is clicked, all editing items are invalidated to close the window, in a well-known manner.

Meanwhile, the pose window 700 can be used not only for editing the pose of the mobile robot 1 on the authoring system, but also for reading in the orientation as taught to the mobile robot 1 on an actual device, that is joint values of the respective joint actuators, into the system for pre-viewing.

Figure 27:
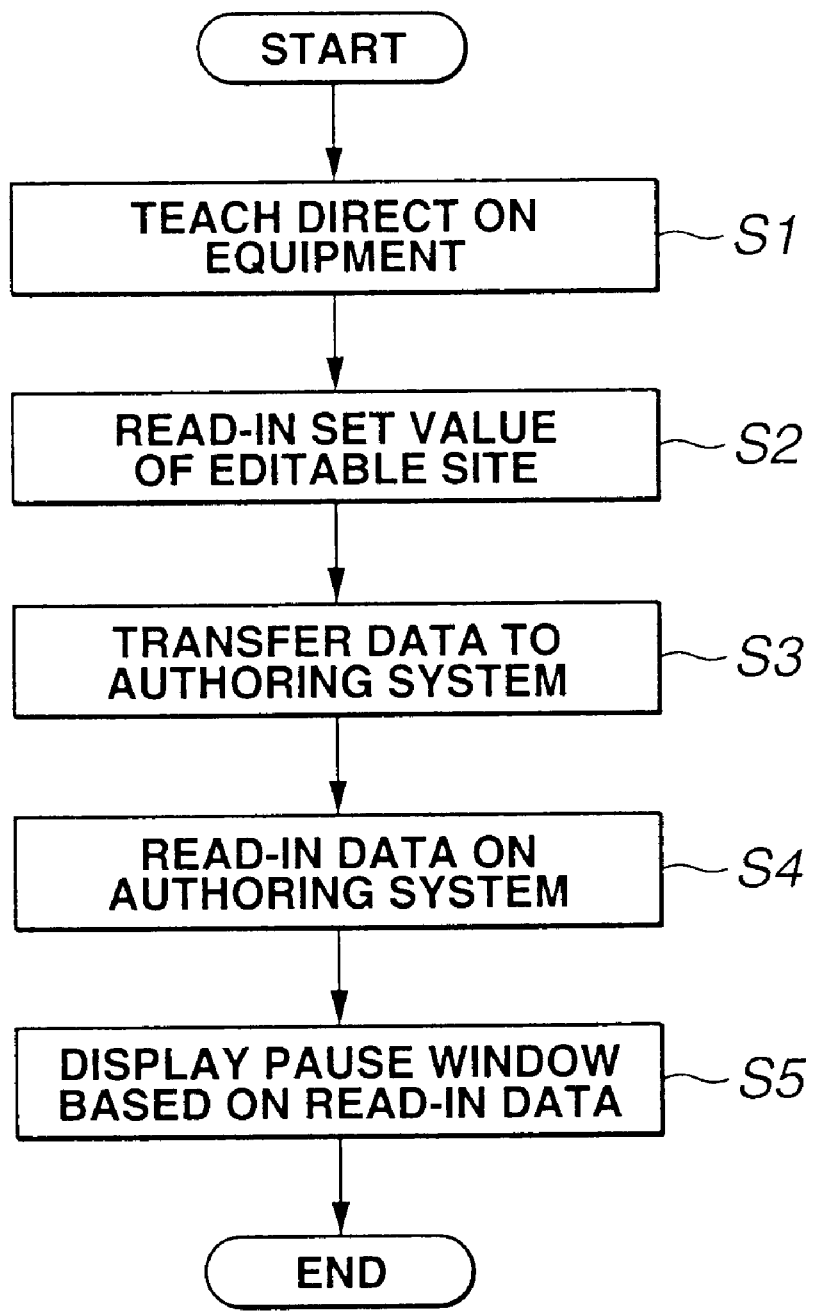
FIG. 27 is a flowchart for pre-view on the pose window of the contents directly taught on an actual machine.

FIG. 27 shows a block diagram for illustrating the processing sequence for previewing the contents as directly taught on the actual device on the pose window 700. The operations of the flowchart are hereinafter explained.

First, an operator of the mobile robot 1 performs direct teaching, such as by manually holding the trunk or legs on the actual machine to cause the actual machine to strike a pose (step S1).

The setting values in the editable sites, such as joint actuators, obtained as a result of the direct teaching, are then read-in and transiently saved (step S2). The setting values are then transferred to the authoring system (step S3).

There is no particular limitation to the method of data transfer to the authoring system. For example, near radio data communication, such as Bluetooth, may be used, or data transfer may be made between different devices over a recording medium, such as memory stick.

The authoring system reads-in the setting values of the editable sites (step S4) to open the pose window 700 to update the display contents or picture contents in the entity specifying area 701, list specifying area 702, setting value area 703 3D and in the display area 704 in accordance with the read-in setting values (step S5).

The authoring system of the present embodiment includes a motion previewer 800 for previewing the motion as edited by the motion channel as explained previously or the motion having the respective poses edited by the pose window as keyframes.

FIG. 28 schematically shows the structure of the motion previewer 800. This motion previewer 800 can be opened on double-clicking the motion file displayed in a tree style on the project window.

On the motion previewer 800, the motion can be previewed, while it can also be copied for pasting on the action editing window 200.

The motion previewer 800 is adapted for displaying a thumbnail of one or more keyframes 801 making up the motion, that is the thumbnail of the poses. The keyframes

801 are arrayed e.g., in the chronological order in which the motion is reproduced.

The keyframes in the motion previewer 800 may be dragged into the action editing window 200. If there are too many keyframes making up the motion in the preview, horizontal scrolling is used.

[Supplement]

Although the present invention has been elucidated with reference to specified embodiments thereof, the present invention can, of course, be corrected or substituted by those skilled in the art without departing from the scope of the invention.

Although the present embodiment is directed to an authoring system for a pet type robot walking on four legs, like a dog, this is not intended to limit the present invention because the present invention can similarly be applied to a two-legged robot such as a humanoid robot or to a mobile robot other than a legged robot.

Moreover, the 'multi-joint' as defined in the claim is not limited to a physical apparatus typified in particular by a legged robot. For example, the authoring system of the present invention may, of course, be used for creating and editing the operating sequence for an animation employing a character generated by computer graphics.

The present invention has been elucidated only by way of illustration and hence is not to be construed in a limiting fashion. The purport of the present invention is to be verified in the light of the description in the claims.

INDUSTRIAL APPLICABILITY

According to the present invention, described above, there may be provided an excellent authoring system and method capable of supporting the creation and editing of the sequence of commands and data stating a preset pattern of operations for a robot.

According to the present invention, there may be provided an excellent authoring system and method capable of supporting the creation and editing of the movement patterns can be supported using a set of components prescribing the operating states of the robot.

Moreover, according to the present invention, there may be provided an excellent authoring system and method whereby the component parts of the robot can be arrayed on the computer display to support the creation and editing of the movement pattern.

In the authoring system and method according to the present invention, chronological data forming the action of the mobile robot, such as motion data, sound data or LED operation data, are arrayed along the time axis for display on a time table of a two-dimensional time line style. Consequently, such a working environment may be provided in which creation and editing may be made as the user visually checks for synchronization between respective chronological data to warrant a working environment of efficient and intuitively comprehensible action edition.

In the authoring system and method according to the present invention, such a tool may be provided in which a multi-joint structure, including a robot first of all, may be handled as a new entertainment. According to the present invention, the behavior of the multi-joint structure, including a robot in particular, can be programmed to formulate contents extremely readily even in the absence of the profound knowledge about computer programming. For example, the user owns a tool for expressing a multi-joint structure to expand the world offered by the robot.

In the authoring system and method according to the present invention, a user is able to execute programming pertaining to the behavioral sequence of a multi-joint structure through GUI operations. Moreover, the programing operations on the GUI picture may be further simplified and improved in efficiency by providing abundant library.

The operating sequence, that is behavior, of a robot, may be constructed by unifying respective contents, that is motion, sound and the LD operations. According to the present invention, such a working environment may be provided which warrants facilitated synchronization between the respective contents by exploiting a time line in an editing picture of these respective contents. On the GUI picture according to the present invention, the contents can not only be processed as individual data but also treated as actions comprised of combinations of different contents.

What is claimed is:

1. An authoring system for supporting the creation and editing of an action to be performed by a multi-joint robot, said action represented by a combination of a plurality of chronological data, the system comprising:

a user inputting unit for inputting commands or data from a user;

a user presenting unit for presenting an editing area in which chronological data making up the action are arrayed chronologically along the time axis; and a chronological data editing unit provided for each chronological data making up the action, said chronological data editing unit creating or editing relevant chronological data based on a user input through said user presenting unit.

2. The authoring system according to claim 1 wherein one of the chronological data making up the action is motion data stating the chronological movements of respective joints of the multi-joint robot.

3. The authoring system according to claim 1 wherein one of the chronological data making up the action is motion data which prescribes chronological movements of respective joints of the multi-joint robot and which, by arraying two or more keyframes each representing the multi-joint robot striking a preset pose on the time axis, smoothly joins the respective keyframes.

4. The authoring system according to claim 1 wherein one of the chronological data making up the action is sound data output as sound in timed relation to reproduction of said action.

5. The authoring system according to claim 4 wherein the sound data is stated in the MIDI (Musical Instrumental Digital Interface) form or WAVE form.

6. The authoring system according to claim 1 wherein one of the chronological data making up the action is indicator display data stating the turning on/off of display indicators displayed in timed relation to reproduction of said action.

7. The authoring system according to claim 1 wherein indicator display data is stated in the MIDI (Musical Instrumental Digital Interface) form.

8. The authoring system according to claim 1 wherein the editing area presented by said user presenting unit is comprised of chronological data based chronological data display channels, said data extending along the horizontally arrayed time axis, said channels being arrayed in the vertical direction.

9. The authoring system according to claim 8 wherein the editing area presented by said user presenting unit includes a time ruler made up by graduations representing the time axis in real-time.

10. The authoring system according to claim 8 wherein the editing area presented by said user presenting unit includes one or more time display lines extending in the vertical direction for indicating the relevant time prescribed by a time ruler.

11. The authoring system according to claim 8 wherein the editing area presented by said user presenting unit includes a vertically extending current time display line for indicating the current time on the time axis prescribed by the time ruler;

said current time display line being shifted on the time ruler to a position corresponding to user actuation.

12. The authoring system according to claim 8 wherein the editing area presented by said user presenting unit includes a display window for previewing movements of the multi-joint robot at the current time.

13. The authoring system according to claim 8 wherein one of the chronological data making up the action is motion data which prescribes the chronological movements of respective joints of the multi-joint robot and which arrays two or more keyframes, each representing the multi-joint robot striking a preset pose, to smoothly join the respective keyframes;

said editing area presented by said user presenting unit including a keyframe channel representing each keyframe or its thumbnail along the time axis prescribed by said time ruler.

14. The authoring system according to claim 13 wherein the keyframe time is changed so as to follow up with dragging of said keyframe or its thumbnail within the keyframe channel.

15. The authoring system according to claim 13 wherein a pose editing picture for editing a relevant pose is started responsive to a selecting operation by a user of a keyframe or its thumbnail within the keyframe channel.

16. The authoring system according to claim 8 wherein one of the chronological data making up the action is motion data stating the chronological movements of respective joints of the multi-joint robot;

the editing area presented by said user presenting unit includes a motion channel for editing and displaying the contents of a motion along the time axis prescribed by the time ruler.

17. The authoring system according to claim 16 wherein said motion channel is comprised of respective timing charts representing chronological movements of respective joints of the multi-joint robot, said timing charts being arrayed in the vertical direction.

18. The authoring system according to claim 17 wherein the movements of joints at a relevant timing are changed so as to follow up with dragging on the timing chart in said motion channel.

19. The authoring system according to claim 8 wherein one of the chronological data making up the action is sound data issued as sound in timed relation to reproduction of an action; the editing area presented by said user presenting unit including a sound channel for indicating the contents of the sound along the time axis prescribed by the time ruler.

20. The authoring system according to claim 8 wherein one of the chronological data making up the action is indicator display data stating the operation of the turning on/off of display indicators, as output in timed relation to the reproduction of an action; the editing area presented by said user presenting unit including a display indicator channel for indicating the contents of the indicator data along the time axis prescribed by the time ruler.

21. The authoring system according to claim 1 wherein one of the chronological data making up the action is sound data output as sound in timed relation to the reproduction of an action;

said user presenting unit further indicating a sound editing area for indicating and editing the sound contents along the time axis prescribed by said time ruler.

22. The authoring system according to claim 21 wherein said sound editing area includes a score channel constituted by a basic grid along the time axis direction and a piano keyboard;

a score being formed by the sound duration as the reference of the time axis and the pitch of the piano keys;

the sound being edited by arraying the color corresponding to sound notes in a cell corresponding to the desired time point and the sound scale.

23. The authoring system according to claim 21 wherein said sound editing area includes a velocity channel for representing the intensity of each sound along the time axis.

24. The authoring system according to claim 1 wherein one of the chronological data making up an action is indicator data stating the turning on/off of an indicator, output in timed relation to the reproduction of an action;

said user presenting unit further indicating an indicator editing area for displaying and editing the contents of indicator data along the time axis prescribed by the time ruler.

25. The authoring system according to claim 24 wherein said indicator editing area includes a score channel constituted by a list of sites of arraying of display indicators and by the basic grid along the time axis direction;

a score being edited from one site list to another by indicating the turned-on state of the indicator in each site on the time axis on a score channel.

26. The authoring system according to claim 1 wherein said user presenting unit further displays a preview window for visually checking an action of the multi-joint robot generated based on each chronological data as edited by the chronological data editing unit.

27. The authoring system according to claim 26 wherein one of the chronological data making up an action is motion data stating the chronological movements of the respective joints of the multi-joint robot;

said preview window including a 3D view area for three-dimensional display of movements of the multi-joint robot generated based on motion data.

28. The authoring system according to claim 26 wherein one of the chronological data making up an action is indicator data stating the turning on/off of an indicator, output in timed relation to the reproduction of an action;

said preview window including an indicator operation preview area for displaying the operation of the indicators corresponding to the indicator display data in synchronism with the preview of other chronological data.

29. The authoring system according to claim 1 wherein said user presenting unit further displays a pose window for editing the pose of the multi-joint robot by the GUI operation.

30. The authoring system according to claim 29 wherein said pose window includes an entity specifying area for displaying the multi-joint robot in a developed plan view for accepting user selection of editable sites.

31. The authoring system according to claim 29 wherein said pose window includes a list specifying area for displaying a list of editable sites of the multi-joint robot and setting values thereof.

32. The authoring system according to claim 29 wherein said pose window includes a setting value area for displaying a list of the names of setting sites, setting values, settable maximum values and settable minimum values of editable sites of the multi-joint robot.

33. The authoring system according to claim 29 wherein said pose window includes a 3D display area for 3D displaying a full image of the multi-joint robot generated by 3D graphics and for accepting user selection on said 3D display.

34. The authoring system according to claim 29 further comprising:
   data inputting means for externally inputting chronological data making up an action of the multi-joint robot;
   said pose window displaying the pose generated based on data input from said data inputting means.

35. The authoring system according to claim 1 wherein one of the chronological data making up an action is motion data which prescribes chronological movements of respective joints of the multi-joint robot and which arrays two or more keyframes each representing the multi-joint structure striking a preset pose to smoothly join the respective keyframes;
   said user presenting unit further displaying a motion preview window arraying one or more key frames making up the motion or thumbnails thereof in accordance with the chronological sequence used in motion reproduction.

36. An authoring method for supporting the creation and editing of an action to be performed by a multi-joint robot, said action comprised of a combination of a plurality of chronological data, said method comprising:
   a user presenting step of presenting an editing area in which the chronological data making up the action are arrayed chronologically along the time axis; and
   a chronological data editing step for creating or editing relevant chronological data based on a user input through the editing area, provided for each chronological data making up the action, via said user presenting step.

37. The authoring method according to claim 36 wherein one of the chronological data making up the action is motion data stating the chronological movements of respective joints of the multi-joint robot.

38. The authoring method according to claim 36 wherein one of the chronological data making up the action is motion data which prescribes chronological movements of respective joints of the multi-joint robot and which, by arraying two or more keyframes each representing the multi-joint robot striking a preset pose on the time axis, smoothly joins the respective keyframes.

39. The authoring method according to claim 36 wherein one of the chronological data making up the action is sound data output as sound in timed relation to reproduction of said action.

40. The authoring method according to claim 39 wherein the sound data is stated in the MIDI (Musical Instrumental Digital Interface) form or WAVE form.

41. The authoring method according to claim 36 wherein one of the chronological data making up the action is indicator display data stating the turning on/off of display indicators, said display data being displayed in timed relation to reproduction of said action.

42. The authoring method according to claim 36 wherein indicator display data is stated in the MIDI (Musical Instrumental Digital Interface) form.

43. The authoring method according to claim 36 wherein the editing area presented in said user presenting step is comprised of chronological data based chronological data display channels, said data extending along the horizontally arrayed time axis, said channels being arrayed in the vertical direction.

44. The authoring method according to claim 43 wherein the editing area presented in said user presenting step includes a time ruler made up by graduations representing the time axis in real-time.

45. The authoring method according to claim 43 wherein the editing area presented by said user presenting step includes one or more time display lines extending in the vertical direction for indicating the relevant time prescribed by a time ruler.

46. The authoring method according to claim 43 wherein the editing area presented by said user presenting step includes a vertically extending current time display line for indicating the current time on the time axis prescribed by the time ruler;
   there being included a further step of shifting said current time display line on the time ruler to a position corresponding to user actuation.

47. The authoring method according to claim 43 further comprising a step of presenting a display window for previewing movements of the multi-joint robot at the current time.

48. The authoring method according to claim 43 wherein one of the chronological data making up the action is motion data which prescribes the chronological movements of respective joints of the multi-joint robot and which arrays two or more keyframes each representing the multi-joint robot striking a preset pose to smoothly join the respective keyframes;
   said user presenting step including presenting a keyframe channel representing each keyframe or its thumbnail along the time axis prescribed by said time ruler.

49. The authoring method according to claim 48 wherein the keyframe time is changed so as to follow up with dragging of said keyframe or its thumbnail within the keyframe channel.

50. The authoring method according to claim 48 wherein a pose editing picture for editing a relevant pose is started responsive to a user selecting operation of a keyframe or its thumbnail within the keyframe channel.

51. The authoring method according to claim 43 wherein one of the chronological data making up the action is motion data stating the chronological movements of respective joints of the multi-joint robot; said user presenting step including a motion channel for editing and displaying the contents of a motion along the time axis prescribed by the time ruler.

52. The authoring method according to claim 51 wherein said user presenting step represents a motion channel by arraying respective timing charts representing chronological movements of respective joints of the multi-joint robot in the vertical direction.

53. The authoring method according to claim 52 further comprising a step of changing the movements of joints at a relevant time so as to follow up with dragging on the timing chart in said motion channel.

54. The authoring method according to claim 43 wherein one of the chronological data making up the action is sound data issued as sound in timed relation to reproduction of an action;
   said user presenting step presenting an editing area including a sound channel for indicating the contents of the sound along the time axis prescribed by the time ruler.

55. The authoring method according to claim 43 wherein one of the chronological data making up the action is indicator data stating the operation of the turning on/off of the indicator, as output in timed relation to the reproduction of an action;

said user presenting step presenting an editing area including a display indicator channel for indicating the contents of the indicator display data along the time axis prescribed by the time ruler.

56. The authoring method according to claim 36 wherein one of the chronological data making up the action is sound data output as sound in timed relation to the reproduction of an action;

there being further provided a step of indicating a sound editing area for indicating and editing the sound contents along the time axis prescribed by said time ruler.

57. The authoring method according to claim 56 wherein said sound editing area includes a score channel constituted by a basic grid along the time axis direction and a piano keyboard;

a score being formed by the sound duration as the reference of the time axis and the pitch of the piano keys;

the sound being edited by arraying the color corresponding to sound notes in a cell corresponding to the desired time point and the sound scale on said score channel.

58. The authoring method according to claim 56 wherein said sound editing area includes a velocity channel for representing the intensity of each sound along the time axis.

59. The authoring method according to claim 36 wherein one of the chronological data making up an action is indicator display data stating the turning on/off of a display indicator, output in timed relation to the reproduction of an action;

there being further provided a step of indicating an indicator editing area for displaying and editing the contents of indicator data along the time axis prescribed by the time ruler.

60. The authoring method according to claim 59 wherein said indicator editing area includes a score channel constituted by a list of arraying sites of the display indicators and by the basic grid along the time axis direction;

a score being edited from one site list to another by indicating the turned-on state of the display indicators in respective sites on the time axis on a score channel.

61. The authoring method according to claim 36 further comprising a step of displaying a preview window for visually checking an action of the multi-joint robot generated based on each chronological data as edited in the chronological data editing step.

62. The authoring method according to claim 61 wherein one of the chronological data making up an action is motion data stating the chronological movements of respective joints of the multi-joint robot;

said preview window indicating step three-dimensionally displaying movements of the multi-joint robot, generated based on motion data, in a 3D view area.

63. The authoring method according to claim 61 wherein one of the chronological data making up an action is indicator data stating the turning on/off of display indicators, output in timed relation to the reproduction of an action;

said preview window indicating step displaying the operation of the display indicators corresponding to the indicator display data in synchronism with the preview of other chronological data.

64. The authoring method according to claim 36 further comprising a step of displaying a pose window for editing the pose of the multi-joint robot by the GUI operation.

65. The authoring method according to claim 64 wherein said pose window includes an entity specifying area for displaying the multi-joint robot in a developed plan view for accepting user selection of editable sites.

66. The authoring method according to claim 64 wherein said pose window includes a list specifying area for displaying a list of editable sites of the multi-joint robot and setting values thereof.

67. The authoring method according to claim 64 wherein said pose window includes a setting value area for displaying a list of the names of setting sites, setting values, settable maximum values and settable minimum values of editable sites of the multi-joint robot.

68. The authoring method according to claim 64 wherein said pose window includes a 3D display area for 3D displaying a full image of the multi-joint robot generated by 3D graphics and for accepting user selection of said editable sites on said 3D display.

69. The authoring method according to claim 64 further comprising a data inputting step of externally inputting chronological data making up an action of the multi-joint robot;

said pose window displaying the pose generated based on data input from said data inputting means.

70. The authoring method according to claim 36 wherein one of the chronological data making up an action is motion data which prescribes chronological movements of respective joints of the multi-joint robot and which arrays two or more keyframes each representing the multi-joint structure striking a preset pose to smoothly join the respective keyframes;

there being further provided a step of displaying a motion preview window arraying one or more key frames making up the motion or thumbnails thereof in accordance with the chronological sequence used in motion reproduction.

71. A recording medium having physically stored thereon, in a computer-readable form, computer software for executing processing for supporting the creation and editing of an action to be performed by a multi-joint robot, said action represented by a combination of plural chronological data, on a computer system, said computer software comprising:

a user presenting step of presenting an editing area in which chronological data making up the action are arrayed chronologically along the time axis; and a chronological data editing step for creating or editing relevant chronological data based on a user input through an editing area by said user presenting step, said editing area being provided for each chronological data making up the action.

* * * * *